US008059717B2

(12) United States Patent
Saigo et al.

(10) Patent No.: US 8,059,717 B2
(45) Date of Patent: Nov. 15, 2011

(54) IMAGE CODING APPARATUS, METHOD AND PROGRAM FOR INTRA PREDICTION USING SPECIFIED H.264 PREDICTION MODES IN SPECIFIED SCAN ORDER

(75) Inventors: Katsuo Saigo, Hyogo (JP); Takuma Chiba, Osaka (JP)

(73) Assignee: Panasonic Corporation, Osaka (JP)

( * ) Notice: Subject to any disclaimer, the term of this patent is extended or adjusted under 35 U.S.C. 154(b) by 1373 days.

(21) Appl. No.: 11/585,171

(22) Filed: Oct. 24, 2006

(65) Prior Publication Data
US 2007/0098070 A1    May 3, 2007

(30) Foreign Application Priority Data

Oct. 28, 2005  (JP) .................. 2005-315462

(51) Int. Cl.
*H04N 7/12* (2006.01)
(52) U.S. Cl. ............... 375/240.12; 375/240.24
(58) Field of Classification Search .......... 375/240.01, 375/240.12, 240.24; *H04N 7/12, 11/04*
See application file for complete search history.

(56) References Cited

U.S. PATENT DOCUMENTS

| 2005/0089094 | A1 | 4/2005 | Yoo et al. | |
|---|---|---|---|---|
| 2006/0126730 | A1* | 6/2006 | Arakawa et al. | 375/240.03 |

FOREIGN PATENT DOCUMENTS

| CN | 1662066 A | 8/2005 |
|---|---|---|
| JP | 2004-140473 | 5/2004 |
| JP | 2005-130509 | 5/2005 |
| JP | 2005-151017 | 6/2005 |
| JP | 2005-160048 | 6/2005 |
| JP | 2005-244666 | 9/2005 |
| JP | 2005-295526 | 10/2005 |

OTHER PUBLICATIONS

Partial English translation of JP 2004-140473, which was cited in the IDS filed on Oct. 24, 2006.
Partial English translation of JP 2004-140473, which was cited in the IDS filed Oct. 24, 2006.
ITU-T Telecommunication Standardization Sector of ITU, H.264 (Mar. 2005), Series H: Audiovisual and Multimedia Systems Infrastructure of Audiovisual services—Coding of moving video, "*Advanced video coding for generic audiovisual services*".

* cited by examiner

*Primary Examiner* — Young Lee
*Assistant Examiner* — Yulin Sun
(74) *Attorney, Agent, or Firm* — Wenderoth, Lind & Ponack, L.L.P.

(57) ABSTRACT

An image coding apparatus that makes possible the parallelization of intra prediction, and outputs coded data that can be decoded by an image decoding apparatus compliant with the H.264 standard. The image coding apparatus performs orthogonal transformation, quantization, inverse quantization, inverse orthogonal transformation, and intra prediction on all blocks obtained when a single macroblock is divided into plural blocks, and includes: a predicted block control unit that causes all of the blocks to be intra predicted using at least one of the intra prediction modes specified in the H.264 standard on at least some of the blocks, in an order different from the raster scan order specified in the H.264 standard; and an sorting buffer that outputs, in the raster scan order, all the blocks intra predicted under the control of the predicted block control unit.

10 Claims, 19 Drawing Sheets

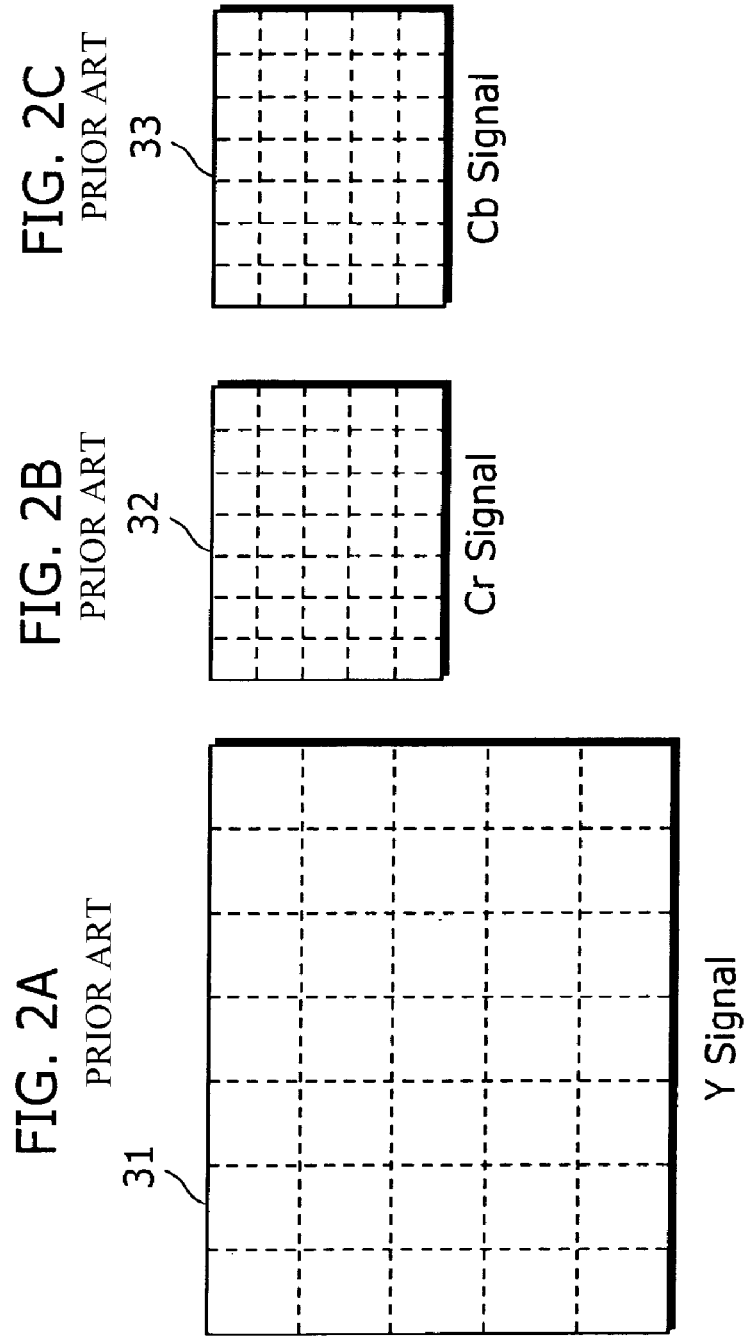

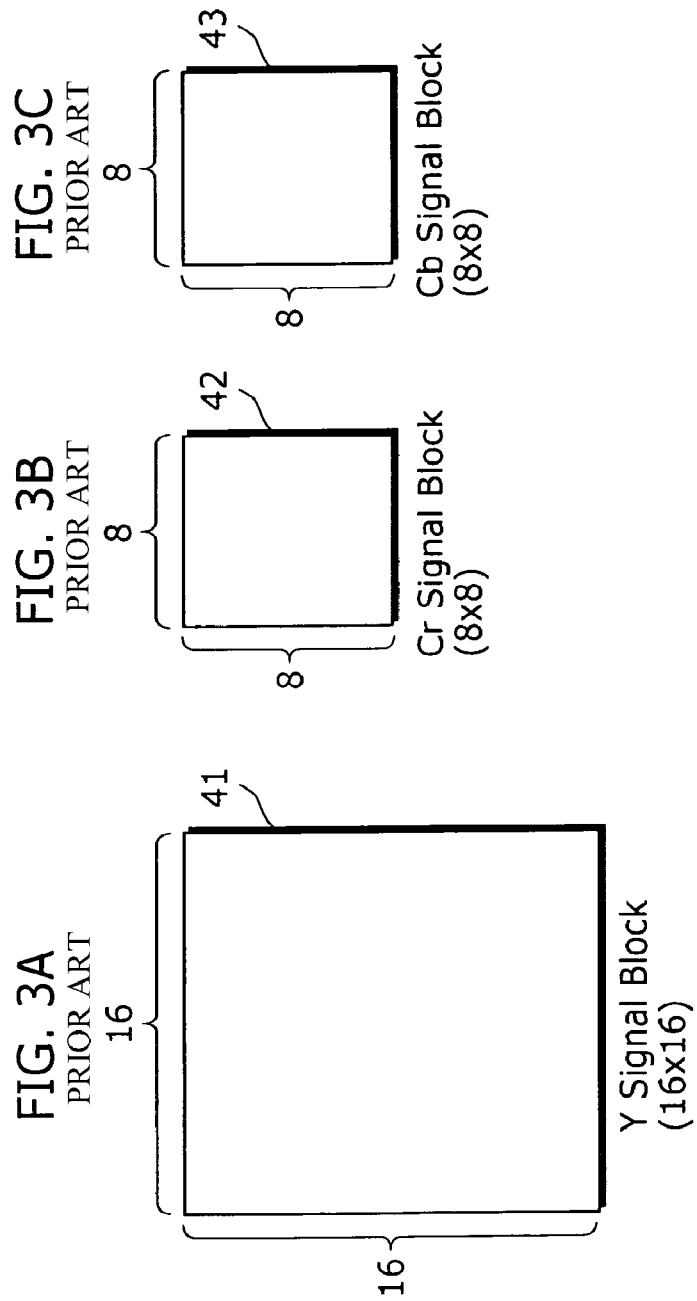

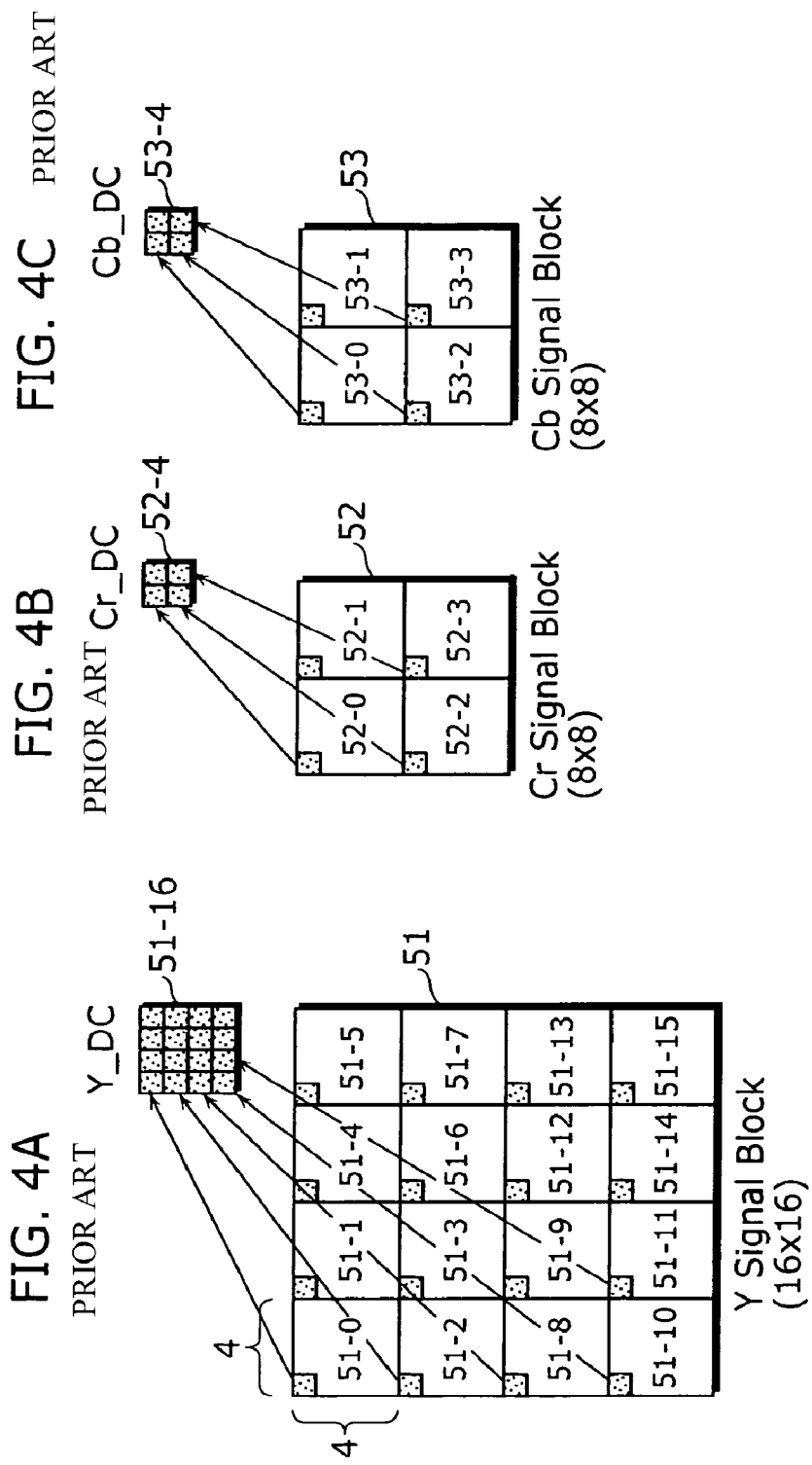

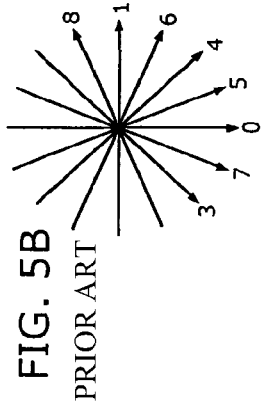

0 (vertical)

1 (horizontal)

2 (DC)

3 (plane)

FIG. 10 PRIOR ART

4x4_block(X,Y)

| (0,0) | (1,0) | (2,0) | (3,0) |
|---|---|---|---|
| (0,1) | (1,1) | (2,1) | (3,1) |
| (0,2) | (1,2) | (2,2) | (3,2) |
| (0,3) | (1,3) | (2,3) | (3,3) |

FIG. 15A

| 0 | 1 | 4 | 5 |
|---|---|---|---|
| 2 | 3 | 6 | 7 |
| 8 | 9 | 12 | 13 |
| 10 | 11 | 14 | 15 |

FIG. 15B

| Mode 0,1,2,3,4, 5,6,7,8 | Mode 0,3,7 | Mode 0,1,2,3,4, 5,6,7,8 | Mode 0,3,7 |
|---|---|---|---|
| Mode 0,3,7 | Mode 0,1,2,4, 5,6,8 | Mode 0,3,7 | Mode 0,1,2,4, 5,6,8 |
| Mode 0,1,2,3,4, 5,6,7,8 | Mode 0,3,7 | Mode 0,1,2,3,4, 5,6,7,8 | Mode 0,3,7 |
| Mode 0,3,7 | Mode 0,1,2,4, 5,6,8 | Mode 0,3,7 | Mode 0,1,2,4, 5,6,8 |

FIG. 15C

| IPD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TQiQiT | 0 | 1 | 2 | 3 | 4 | 5 | 6 | 7 | 8 | 9 | 10 | 11 | 12 | 13 | 14 | 15 |

FIG. 17A

| 0 | 1 | 3 | 5 |
|---|---|---|---|
| 2 | 4 | 6 | 8 |
| 7 | 9 | 11 | 13 |
| 10 | 12 | 14 | 15 |

FIG. 17B

| Mode 0,1,2,3,4,5,6,7,8 | Mode 0,1,2,3,4,5,6,7,8 | Mode 0,1,2,3,4,5,6,7,8 | Mode 0,3,7 |
|---|---|---|---|
| Mode 0,1,2,3,4,5,6,7,8 | Mode 0,1,2,4,5,6,8 | Mode 0,1,2,3,4,5,6,7,8 | Mode 0,1,2,4,5,6,8 |
| Mode 0,3,7 | Mode 0,1,2,3,4,5,6,7,8 | Mode 0,1,2,3,4,5,6,7,8 | Mode 0,1,2,3,4,5,6,7,8 |
| Mode 0,1,2,3,4,5,6,7,8 | Mode 0,1,2,4,5,6,8 | Mode 0,1,2,3,4,5,6,7,8 | Mode 0,1,2,4,5,6,8 |

FIG. 17C

| IPD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TQiQiT | 0 | 1 | 2 | 3 | 4 | 5 | 6 | 7 | 8 | 9 | 10 | 11 | 12 | 13 | 14 | 15 |

IMAGE CODING APPARATUS, METHOD AND PROGRAM FOR INTRA PREDICTION USING SPECIFIED H.264 PREDICTION MODES IN SPECIFIED SCAN ORDER

BACKGROUND OF THE INVENTION (1) Field of the Invention

The present invention relates to an image coding apparatus which performs orthogonal transformation, quantization, inverse quantization, inverse orthogonal transformation, and intra-prediction on blocks into which a macroblock has been divided.

(2) Description of the Related Art

H.264 (also called MPEG-4 AVC) has been standardized as a system for realizing nearly twice the coding efficiency of conventional image coding systems such as MPEG-2 and MPEG-4 (refer to ITU-T Recommendation H.264(March 2005); "Advanced video coding for generic audiovisual services", ITU-T. H.264 is a hybrid system based on orthogonal transformation and motion compensation, and in that respect is similar to conventional systems. However, with H.264, there is a high degree of freedom regarding what coding tools to use when coding each element (blocks, macroblocks, and so on), and high coding efficiency is realized through the collective effects of those coding tools.

FIG. 1 is a block diagram showing the configuration of a conventional image coding apparatus. To make the descriptions easier, only constituent elements related to intra prediction are shown in FIG. 1, and thus a motion prediction unit, a selection unit that selects either intra prediction or motion prediction, a deblocking filter, and the like are omitted from FIG. 1.

This conventional image coding apparatus includes a block division unit 11, a subtraction unit 12, an orthogonal transformation unit (T) 13, a quantization unit (Q) 14, a coding unit 15, an inverse quantization unit (iQ) 16, an inverse orthogonal transformation unit (iT) unit 17, an addition unit 18, a frame memory 19, an intra prediction unit (IPD) 20, and a rate control unit 21.

Considering a moving picture that is made up of continuous pictures (single coding units that include both frame and field), each picture is, as shown in FIGS. 2A to 2C, made up of a single luminance signal (a Y signal 31) and two chrominance signals (a Cr signal 32 and a Cb signal 33), in the case where the pictures are in 4:2:0 format; the image size of the chrominance signals is half that of the luminance signal in both the vertical and horizontal directions.

In addition, each picture is divided into blocks, and coding is performed on a block-by-block basis. These blocks are called "macroblocks." A macroblock is made up of a single Y signal block 41, shown in FIG. 3A, which is of 16×16 pixels; and a Cr signal block 42 and a Cb signal block 43, shown in FIGS. 3B and C, which are of 8×8 pixels respectively, and which spatially match the Y signal block 41 (refer to ITU-T Recommendation H.264(March 2005); "Advanced video coding for generic audiovisual services", ITU-T.

Each picture is divided by the block division unit 11 into input macroblocks, and the input macroblocks are inputted into the subtraction unit 12. For each pixel in each position, the subtraction unit 12 subtracts the pixel value in a predicted macroblock generated by the intra prediction unit (IPD) 20 from the pixel value in the inputted macroblock, and outputs the resultant as a differential macroblock. The differential macroblock is inputted into the orthogonal transformation unit (T) 13, which performs orthogonal transformation on the differential macroblock. It should be noted that while the size of the block on which orthogonal transformation is performed is 8×8 pixels in the MPEG system, 4×4 pixels is the basic size used in H.264.

The orthogonal transformation unit (T) 13 first divides the differential macroblock into 24 4×4 pixel blocks ("51-0" to "51-15", "52-0" to "52-3" and "53-0" to "53-3"), as shown in FIGS. 4A to C, and then performs orthogonal transformation on each pixel block. Note that in the case where the differential macroblock is made up of intra 16×16 pixels, as shall be described later, the orthogonal transformation unit (T) 13 further configures, per signal element, orthogonal blocks ("51-16", "52-4", and "53-4") in which only the DC element of each 4×4 orthogonally-transformed block is gathered, and performs orthogonal transformation on these blocks. Each transform coefficient within the orthogonally-transformed block is inputted into the quantization unit (Q) 14.

The quantization unit (Q) 14 quantizes the transform coefficients within each orthogonally-transformed block in accordance with quantization parameters inputted from the rate control unit 21. The quantized orthogonal transform coefficients are inputted into the coding unit 15 and coded. With H.264, the coding unit 15 codes the quantized orthogonal transform coefficients through variable-length coding; for example, through Context-based Adaptive Variable-Length Coding (CAVLC) or Context-based Adaptive Binary Arithmetic Coding (CABAC).

The coding unit 15 codes the quantized orthogonal transform coefficients in the above manner, codes macroblock type information and a prediction mode, which shall be mentioned later, and outputs the resultant as a stream.

The quantized orthogonal transform coefficients are supplied to the coding unit 15, and are also inputted into the inverse quantization unit (iQ) 16. The inverse quantization unit (iQ) 16 performs inverse quantization on the quantized orthogonal transform coefficients in accordance with quantization parameters inputted from the rate control unit 21. An orthogonally-transformed block is thereby reconstructed. The reconstructed orthogonally-transformed block is inverse orthogonally-transformed by the inverse orthogonal transform unit (iT) 17, and a differential macroblock is thereby reconstructed. The reconstructed differential macroblock is inputted, along with the predicted macroblock generated by the intra prediction unit (IPD) 20, into the addition unit 18.

For each pixel in each position, the addition unit 18 adds the pixel value in the reconstructed differential macroblock with the pixel value in the predicted macroblock, thereby generating a reproduction macroblock. As this reproduction macroblock is used in intra prediction, it is stored in the frame memory 19.

Next, a prediction method and prediction modes used when the intra prediction unit (IPD) 20 generates a predicted macroblock shall be described.

Intra prediction is a method for predicting pixel values within a macroblock using coded pixels within a frame. With the H.264 coding system, two types of block sizes are prepared as basic units for prediction. These types are macroblock types called "intra 4×4 prediction" and "intra 16×16 prediction."

Furthermore, there are 9 types of prediction modes for intra 4×4 prediction macroblock types, and 4 types of prediction modes for intra 16×16 macroblock types, and the prediction modes can be selected on a macroblock-by-macroblock basis (for example, in intra 4×4 prediction, per every 4×4 pixel macroblock).

FIG. 5A is a diagram showing an arrangement of pixels to be predicted (16 pixels, or "a" to "p") and pixels (reconstructed adjacent pixels, of which there are 12 pixels, or "A"

to "L") used in prediction (decoded after coding and reproduced), in the intra 4×4 prediction type. Here, the pixels to be predicted ("a" to "p") are pixels within the macroblock to be coded that has been outputted by the block division unit 11; the reconstructed adjacent pixels ("A" to "L") are pixels of a block or macroblock reproduced after being decoded, and are read out from the memory 19.

FIG. 5B is a diagram showing prediction directions in intra 4×4 prediction. The pixel values of pixels to be predicted are calculated using pixel values of the reconstructed adjacent pixels, in accordance with a prediction direction, using a standardized arithmetic expression (refer to ITU-T Recommendation H.264(March 2005); "Advanced video coding for generic audiovisual services", ITU-T. Prediction directions are identified by mode numbers (mode 0 to mode 8). FIGS. 5C to 5K each show a mode number and a corresponding prediction direction. With a block 60 in mode 0 shown in FIG. 5C, the prediction direction is vertical; with a block 61 in mode 1 shown in FIG. 5D, the prediction direction is horizontal; and with a block 62 is mode 2 shown in FIG. 5E, the prediction uses an average (DC). In addition, with a block 63 in mode 3 shown in FIG. 5F, the prediction direction is diagonal down-left; with a block 64 in mode 4 shown in FIG. 5G, the prediction direction is diagonal down-right; and with a block 65 in mode 5 shown in FIG. 5H, the prediction direction is vertical-right. Finally, with a block 66 in mode 6 shown in FIG. 5I, the prediction direction is horizontal-down; with a block 67 in mode 7 shown in FIG. 5J, the prediction direction is vertical-left; and with a block 68 in mode 8 shown in FIG. 5K, the prediction direction is horizontal-up.

Intra 4×4 prediction is applied to the luminance signal. For example, if the prediction value of a pixel is "P", the prediction values P in each mode are as shown below. Here, adjacent pixels "A" to "M" shown in FIGS. 5C to K and used in prediction are reconstructed pixels that have already been reproduced after being decoded. However, the value of the pixel "D" may be substituted for pixels "E" to "H" temporarily in the case where pixels "E" to "H" have not yet been reconstructed or belong to a different slice or different frame from the 4×4 block.

In mode 0 (vertical), as shown by the block 60 in FIG. 5C, it is possible to predict the values of each pixel within the block 60 when reference pixels "A", "B", "C", and "D" are present; each prediction value P is calculated as follows:

| | |
|---|---|
| a, e, i, m: | P = A |
| b, f, j, n: | P = B |
| c, g, k, o: | P = C |
| d, h, l, p: | P = D |

In mode 1 (horizontal), as shown by the block 61 in FIG. 5D, it is possible to predict the values of each pixel within the block 61 when reference pixels "I", "J", "K", and "L" are present; each prediction value P is calculated as follows:

| | |
|---|---|
| a, b, c, d: | P = I |
| e, f, g, h: | P = J |
| i, j, k, l: | P = K |
| m, n, o, p: | P = L |

In mode 2 (DC), as shown by the block 62 in FIG. 5E, the prediction value P for each pixel in the block 62 is as follows when reference pixels "A", "B", "C", "D", "I", "J", "K", and "L" are present:

$$P=(A+B+C+D+I+J+K+L+4)>>3$$

The prediction value P for each pixel in the block 62 is as follows when only reference pixels "I", "J", "K", and "L" are present:

$$P=(I+J+K+L+2)>>2$$

In addition, the prediction value P for each pixel in the block 62 is as follows when only reference pixels "A", "B", "C", and "D" are present:

$$P=(A+B+D+C+2)>>2$$

Furthermore, the prediction value P for each pixel in the block 62 is as follows when none of reference pixels "A", "B", "C", "D", "I", "J", "K", and "L" are present:

$$P=128$$

In mode 3 (diagonal down-left), as shown by the block 63 in FIG. 5F, the prediction value P for each pixel in the block 63 is as follows when reference pixels "A", "B", "C", "D", "E", "F", "G", and "H" are present:

| | |
|---|---|
| a: | P = (A + 2B + C + 2)>>2 |
| b, e: | P = (B + 2C + D + 2)>>2 |
| c, f, i: | P = (C + 2D + E + 2)>>2 |
| d, g, j, m: | P = (D + 2E + F + 2)>>2 |
| h, k, n: | P = (E + 2F + G + 2)>>2 |
| l, o: | P = (F + 2G + H + 2)>>2 |
| p: | P = (G + 3H + 2)>>2 |

In mode 4 (diagonal down-right), as shown by the block 64 in FIG. 5G, the prediction value P for each pixel in the block 64 is as follows when reference pixels "A", "B", "C", "D", "I", "J", "K", "L", and "M" are present:

| | |
|---|---|
| a, f, k, p: | P = (A + 2M + I + 2)>>2 |
| b, g, l: | P = (M + 2A + B + 2)>>2 |
| c, h: | P = (A + 2B + C + 2)>>2 |
| d: | P = (B + 2C + D + 2)>>2 |
| e, j, o: | P = (M + 2I + J + 2)>>2 |
| i, n: | P = (I + 2J + K + 2)>>2 |
| m: | P = (J + 2K + L + 2)>>2 |

In mode 5 (vertical-right), as shown by the block 65 in FIG. 5H, the prediction value P for each pixel in the block 65 is as follows when reference pixels "A", "B", "C", "D", "I", "J", "K", "L", and "M" are present:

| | |
|---|---|
| a, j: | P = (M + A + 1)>>1 |
| b, k: | P = (A + B + 1)>>1 |
| c, l: | P = (B + C + 1)>>1 |
| d: | P = (C + D + 1)>>1 |
| e, n: | P = (I + 2M + A + 2)>>2 |
| f, o: | P = (M + 2A + B + 2)>>2 |
| g, p: | P = (A + 2B + C + 2)>>2 |
| h: | P = (B + 2C + D + 2)>>2 |
| i: | P = (J + 2I + M + 2)>>2 |
| m: | P = (K + 2J + I + 2)>>2 |

In mode 6 (horizontal-down), as shown by the block 66 in FIG. 5I, the prediction value P for each pixel in the block 66 is as follows when reference pixels "A", "B", "C", "D", "I", "J", "K", "L", and "M" are present:

| | |
|---|---|
| a, g: | P = (M + I + 1)>>1 |
| e, k: | P = (I + J + 1)>>1 |
| i, o: | P = (J + K + 1)>>1 |
| m: | P = (K + L + 1)>>1 |
| f, l: | P = (M + 2I + J + 2)>>2 |
| j, p: | P = (I + 2J + K + 2)>>2 |
| n: | P = (J + 2K + L + 2)>>2 |
| b, h: | P = (I + 2M + A + 2)>>2 |
| c: | P = (B + 2A + M + 2)>>2 |
| d: | P = (C + 2B + A + 2)>>2 |

In mode 7 (vertical-left), as shown by the block 67 in FIG. 5J, the prediction value P for each pixel in the block 67 is as follows when reference pixels "A", "B", "C", "D", "E", "F", "G", and "H" are present:

| | |
|---|---|
| a: | P = (A + B + 1)>>1 |
| b, i: | P = (B + C + 1)>>1 |
| c, j: | P = (C + D + 1)>>1 |
| d, k: | P = (D + E + 1)>>1 |
| l: | P = (E + F + 1)>>1 |
| e: | P = (A + 2B + C + 2)>>2 |
| f, m: | P = (B + 2C + D + 2)>>2 |
| g, n: | P = (C + 2D + E + 2)>>2 |
| h, o: | P = (D + 2E + F + 2)>>2 |
| p: | P = (E + 2F + G + 2)>>2 |

In mode 8 (horizontal-up), as shown by the block 68 in FIG. 5K, the prediction value P for each pixel in the block 68 is as follows when reference pixels "I", "J", "K", and "L" are present:

| | |
|---|---|
| a: | P = (I + J + 1)>>1 |
| e, c: | P = (J + K + 1)>>1 |
| i, g: | P = (K + L + 1)>>1 |
| b: | P = (I + 2J + K + 2)>>2 |
| f, d: | P = (J + 2K + L + 2)>>2 |
| j, h: | P = (K + 3L + 2)>>2 |
| k, l, m, n, o, p: | P = L |

In addition, regarding the luminance signal, 4 prediction modes (mode 0 (vertical) (A); mode 1 (horizontal) (B); mode 2 (DC average) (C); and mode 3 (plane) (D)) are defined for intra 16×16 prediction in the H.264 standard, and are shown in FIGS. 6A through D (refer to ITU-T Recommendation H.264(March 2005); "Advanced video coding for generic audiovisual services", ITU-T. Hence, there is a total of 13 prediction modes, including the intra 4×4 prediction modes mentioned above, from which the optimal prediction mode can be selected and used in coding.

Regarding the chrominance signals, 4 prediction modes (prediction modes using the same prediction directions as in intra 16×16 prediction for the luminance signal; however, mode 0 is DC, mode 1 is horizontal, mode 2 is vertical, and mode 3 is plane) are defined for an 8×8 pixel block, and it is possible to code the chrominance signals independently from the luminance signal.

In intra prediction, intra 8×8 prediction is added for the luminance signal as a Fidelity Range Extension. Intra 8×8 prediction has been introduced in combination with the addition of encoding tools for orthogonal transformation of 8×8 pixels, with the goal of improving the coding efficiency of high-definition moving pictures. With intra 8×8 prediction, macroblocks are divided into 4 blocks, each block is smoothed with a 3-tap low-pass filter, and prediction is carried out using one of the 9 modes, in the same manner as in intra 4×4 prediction (refer to ITU-T Recommendation H.264 (March 2005); "Advanced video coding for generic audiovisual services", ITU-T.

Note that for each predicted block predicted in each mode of each prediction type, the position and size of that block is compared to the position and size of the corresponding target block outputted by the block division unit 11, and an evaluation value is calculated for each predicted block based on an evaluation function that, for example, sums the absolute value of the difference between the two blocks. Based on each calculated evaluation value, a predicted block of the best prediction mode, which is the prediction mode estimated to have the lowest coding amount, is selected, and that predicted block is outputted to the subtraction unit 12 and the adding unit 18.

In addition, the intra prediction unit (IPD) 20 outputs information relating to the mode number of the selected prediction mode to the coding unit 15.

In H.264 coding, each 4×4 pixel block included in a macroblock is, by default, coded in the zigzag raster scan order indicated by the numbers in the blocks in FIG. 7. With intra prediction, it is necessary to code and decode the images in the surrounding blocks in advance in order to predict a certain block. For example, to carry out intra prediction on the number 6 block in FIG. 7 through all intra prediction modes (9 modes in intra 4×4 prediction), reference pixels of the decoded image in the number 3 (left), number 1 (lower left), number 4 (upper), and number 5 (lower right) blocks are necessary. In other words, in order to predict the abovementioned certain block, a series of processes, or intra prediction (IPD), orthogonal transformation (T), quantization (Q), inverse quantization (iQ), and inverse orthogonal transformation (iT), must first end for the surrounding blocks.

However, if coding is performed in the default zigzag raster scan order shown in FIG. 7, intra prediction cannot begin until decoding of all the shaded blocks shown in FIG. 8A, or blocks 1, 2, 3, 5, 6, 7, 9, 10, 11, 13, 14, and 15, has finished. Note that for blocks 3, 11, 7, 13, and 15, the upper-right block cannot, by nature, be referred to (coding and decoding of the upper-right block is later timewise); therefore, the values of pixels furthest to the right in the upper block may be used as the reference pixels for the upper-right block.

Accordingly, as shown by the processing timeline for the predicted blocks in FIG. 8B, downtime arises before starting the IPD (the intra prediction processing series) block processing and the TQiQiT (orthogonal transformation (T), quantization (Q), inverse quantization (iQ), and inverse orthogonal transformation (iT) processing series) block processing, respectively. This downtime becomes an interference when parallelizing (pipelining) the IPD and TQiQiT processing series, and becomes a problem when attempting to speed up coding in H.264.

As a response to these issues, the following technology has been disclosed in Patent Reference 1 (Japanese Laid-Open Patent Application No. 2004-140473): blocks are not sequentially processed in the default zigzag raster scan order shown in FIG. 7; rather, the blocks positioned to the left of and above the predicted block used in prediction are processed two or more places previous in order to the predicted block, which makes pipelining possible.

FIG. 9A can be given as an example of the processing order of predicted blocks in the technology denoted in Patent Reference 1. In FIG. 10, when a macroblock composed of 16 pixels×16 lines is divided into 16 blocks composed of 4 pixels×4 lines and the blocks are processed, assuming the position (address) of each block is defined as (X,Y), where X, Y=0, 1, 2, 3, FIG. 9A shows that the blocks should be processed in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3). However, even if processing is performed in the order shown in FIG. 9A, it can be seen in FIG. 9B that downtime arises when starting intra prediction for six of the blocks, or blocks 1, 2, 6, 10, 14, and 15. Moreover, even with a different processing order, if the rules concerning processing order denoted in Patent Reference 1 are followed, at least six blocks interfere with the parallelization (pipelining) when performing intra prediction with reference to surrounding blocks using all intra prediction modes.

Accordingly, considering the prediction mode, shown in FIG. 5A, that uses the reference pixels "E" to "H" positioned above the upper-right block, and which is one of the default prediction modes in intra prediction, interference with the parallelization (pipelining) processing on blocks 2, 6, 10, and 14 is avoided in the technology denoted in Patent Reference 1 by changing prediction modes to a mode that does not use the reference pixels "E" to "H". In other words, interference with parallelization (pipelining) is avoided by using a prediction mode not specified in the H.264 standard.

Furthermore, a static value (for example, 128) is used as the prediction value for the remaining blocks 1 and 15, as can be seen in FIG. 11A. Or, pixel values of a decoded image in the block located two blocks to the left are used, as can be seen in FIG. 11B. Through this, interference with the parallelization (pipelining) processing is avoided.

FIG. 12 is a block diagram showing the configuration of the image coding apparatus disclosed in Patent Reference 1. A predicted block control unit 192 causes an intra prediction unit (IPD) 20 to perform intra prediction using a prediction mode not specified in the H.264 standard in the order shown in FIG. 18A.

It should be noted that with the technology denoted in Patent Reference 1, the image coding apparatus sequentially processes blocks using a prediction mode not specified in the H.264 standard and in an order different from the default zigzag shaped raster scan order, and outputs data. Therefore, the image decoding apparatus is provided with a means for restoring the data of each block to the default zigzag raster scan order and a means for decoding the data of the blocks predicted through the prediction mode not specified in the H.264 standard.

The technology denoted in Patent Reference 1 pipelines the intra prediction and speeds up processing in intra prediction in the H.264 coding system by processing the blocks located above and to the left of a predicted block used in intra prediction two or more places previous to the predicted block, rather than sequentially processing the predicted blocks in the default order. Furthermore, a prediction mode for intra prediction that does not use the reference pixels of a block to the upper-right of the predicted block is provided. For blocks that still cannot be predicted, two methods are suggested: giving the reference pixels a static value, or copying referable pixels located two blocks away and using the copied pixels in prediction.

The image coding apparatus denoted in Patent Reference 1 codes blocks by processing blocks in an order different from the default order of the H.264 standard, using an intra prediction prediction mode different from those specified in the standard, and inserting reference values not allowed in the standard. Therefore, a means for decoding coded data that is different from that specified in the H.264 standard is also required in the image coding apparatus. Accordingly, an image decoding apparatus compliant with the H.264 standard cannot decode data outputted from the image coding apparatus of Patent Reference 1.

SUMMARY OF THE INVENTION

An object of the present invention is to provide an image coding apparatus that makes possible the parallelization (pipelining) of intra prediction, and that outputs coded data that can be decoded by an image decoding apparatus compliant with the H.264 standard.

To achieve the aforementioned object, the image coding apparatus of the present invention performs orthogonal transformation, quantization, inverse quantization, inverse orthogonal transformation, and intra prediction on all blocks obtained when a single macroblock is divided into plural blocks, and includes: a control unit that causes all of the blocks to be intra predicted using at least one of the intra prediction modes specified in the H.264 standard on at least some of the blocks, in an order different from the raster scan order specified in the H.264 standard; and an output unit that outputs, in the raster scan order, all the blocks intra predicted under the control of the control unit.

For example, the control unit causes the intra prediction of a second block, which is a block located to the left of a first block, and the intra prediction of a third block, which is a block located above the first block, to be performed at least two places in processing order ahead of the intra prediction of the first block, the first block being a single block among all the blocks.

As another example, the macroblock has 16 lines made up of 16 pixels each, the blocks each have 4 lines made up of 4 pixels each, and assuming the position of each block in the macroblock is expressed as (X, Y) coordinates, where X, Y=0, 1, 2, 3 starting from the upper left of the macroblock, the control unit: (A) causes the blocks located in positions (0, 1), (2, 1), (0, 3), and (2, 3) to be intra predicted through modes 0, 1, 2, 4, 5, 6, and 8 specified in the H.264 standard; (B) causes the blocks located in positions (1, 0) and (3, 3) to be intra predicted through modes 0, 3, and 7 specified in the H.264 standard; (C) causes the blocks located in positions (0, 0), (2, 0), (3, 0), (1, 1), (3, 1), (0, 2), (1, 2), (2, 2), (3,2), and (1, 3) to be intra predicted through modes 0 through 8 specified in the H.264 standard; and (D) causes the 16 blocks to be intra predicted in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3).

As yet another example, the macroblock has 16 lines made up of 16 pixels each, the blocks each have 4 lines made up of 4 pixels each, and the control unit: (A) causes all the blocks to be intra predicted through modes 0, 1, 2, 4, 5, 6, and 8 specified in the H.264 standard; and (B) causes the 16 blocks to be intra predicted in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3).

According to another aspect of the present invention, the image coding apparatus of the present invention performs orthogonal transformation, quantization, inverse quantization, inverse orthogonal transformation, and intra prediction on all blocks obtained when a single macroblock is divided into plural blocks, and includes: a control unit operable to cause all of the blocks to be intra predicted using at least one of the intra prediction modes specified in the H.264 standard on all of the blocks, in the raster scan order specified in the H.264 standard.

For example, the macroblock has 16 lines made up of 16 pixels each, the blocks each have 4 lines made up of 4 pixels each, and assuming the position of each block in the macroblock is expressed as (X, Y) coordinates, where X, Y=0, 1, 2, 3 starting from the upper left of the macroblock, the control unit: (A) causes the blocks located in positions (0, 1), (2, 1), (0, 3), and (2, 3) to be intra predicted through modes 0, 1, 2, 4, 5, 6, and 8 specified in the H.264 standard; (B) causes the blocks located in positions (1, 0), (3, 0), (1, 1), (3, 1), (1, 2), (3, 2), (1, 3), and (3, 3) to be intra predicted through modes 0, 3, and 7 specified in the H.264 standard; (C) causes the blocks located in positions (0, 0), (2, 0), (0, 2), and (2, 2), to be intra predicted through modes 0 through 8 specified in the H.264 standard; and (D) causes the 16 blocks to be intra predicted in the following order: (0, 0), (1, 0), (0, 1), (1, 1), (2, 0), (3, 0), (2, 1), (3, 1), (0, 2), (1, 2), (0, 3), (1, 3), (2, 2), (3, 2), (2, 3), (3, 3).

The present invention may also be realized as an image coding method which implements the characteristic constituent elements of the image coding apparatus as steps, as a program that causes a computer to execute those steps, or as an integrated circuit that includes the aforementioned characteristic constituent elements. The program mentioned here may be distributed via a storage medium such as a CD-ROM, a transmission medium such as the Internet, and so on.

FURTHER INFORMATION ABOUT TECHNICAL BACKGROUND TO THIS APPLICATION

The disclosure of Japanese Patent Application No. 2005-315462 filed on Oct. 28, 2005, including specification, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a diagram illustrating a video signal of one picture in 4:2:0 format;

FIG. 3 is a diagram illustrating a video signal of one macroblock in 4:2:0 format;

FIG. 4 is a diagram illustrating orthogonally-transformed blocks of one macroblock in 4:2:0 format;

FIG. 5 is a diagram illustrating intra 4×4 prediction of a luminance signal in H.264 image coding;

FIG. 10 is a diagram illustrating a case where position information of intra 4×4 prediction blocks within a macroblock is expressed by (X, Y) coordinates;

FIG. 15 is a diagram illustrating processing conditions and the like of a first intra prediction in the preferred embodiment;

FIG. 17 is a diagram illustrating processing conditions and the like of a second intra prediction in the preferred embodiment;

DESCRIPTION OF THE PREFERRED EMBODIMENT

Hereafter, the preferred embodiment of the present invention shall be described with reference to the diagrams.

Figure 13:
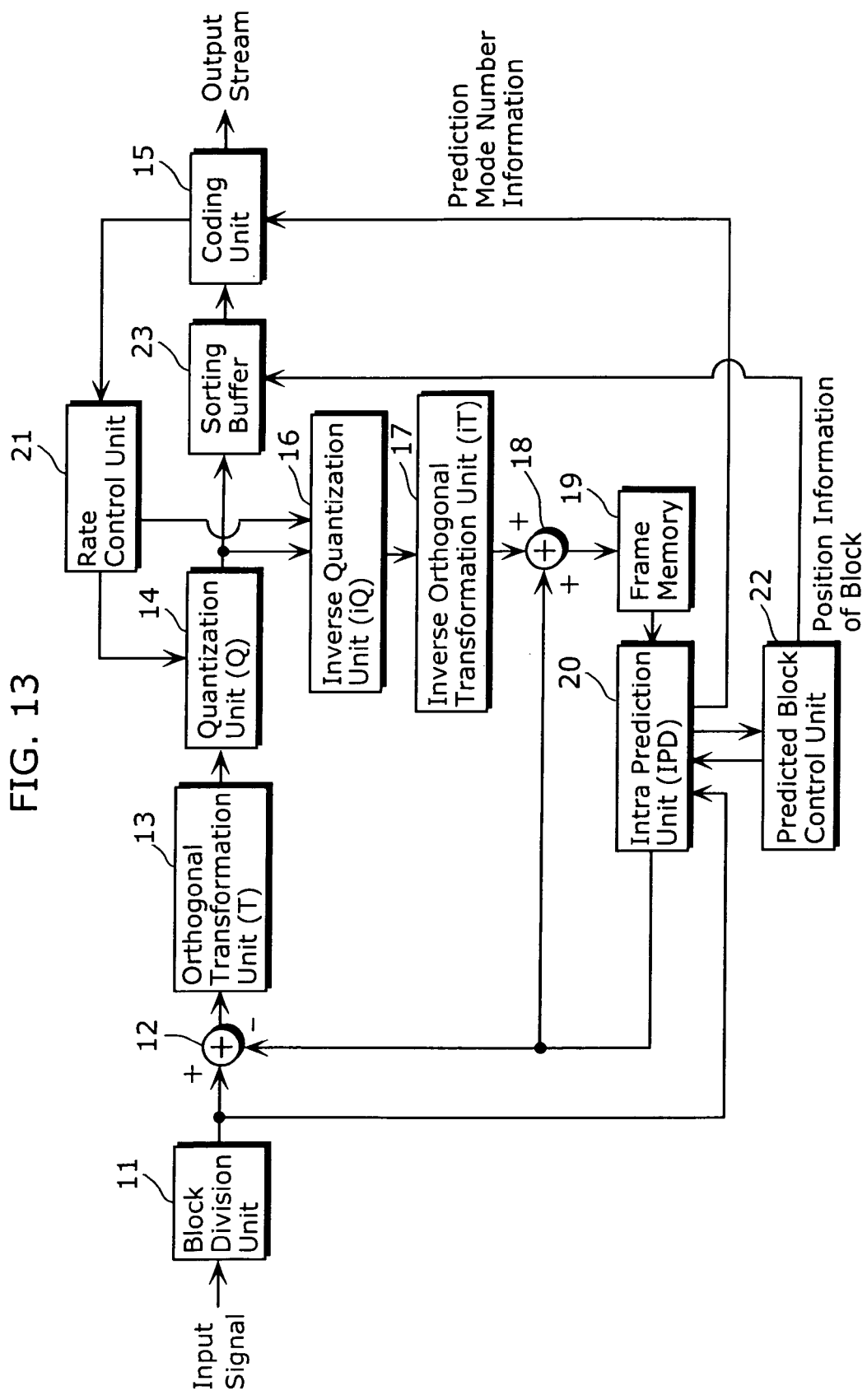
FIG. 13 is a block diagram showing the configuration of an image coding apparatus according to the preferred embodiment.

FIG. 13 is a block diagram showing the configuration of an image coding apparatus according to the preferred embodiment. To make the descriptions more easily understandable, only constituent elements related to intra prediction are shown in FIG. 13. Hence, a motion prediction unit, a selection unit that selects either intra prediction or motion prediction, and a deblocking filter are omitted from FIG. 13.

As shown in FIG. 13, the image coding apparatus of the preferred embodiment includes a block division unit 11, a subtraction unit 12, an orthogonal transformation unit (T) 13, a quantization unit (Q) 14, a coding unit 15, an inverse quantization unit (iQ) 16, an inverse orthogonal transformation unit (iT) unit 17, an addition unit 18, a frame memory 19, an intra prediction unit (IPD) 20, a rate control unit 21, a predicted block control unit 22, and a sorting buffer 23.

Figure 1:
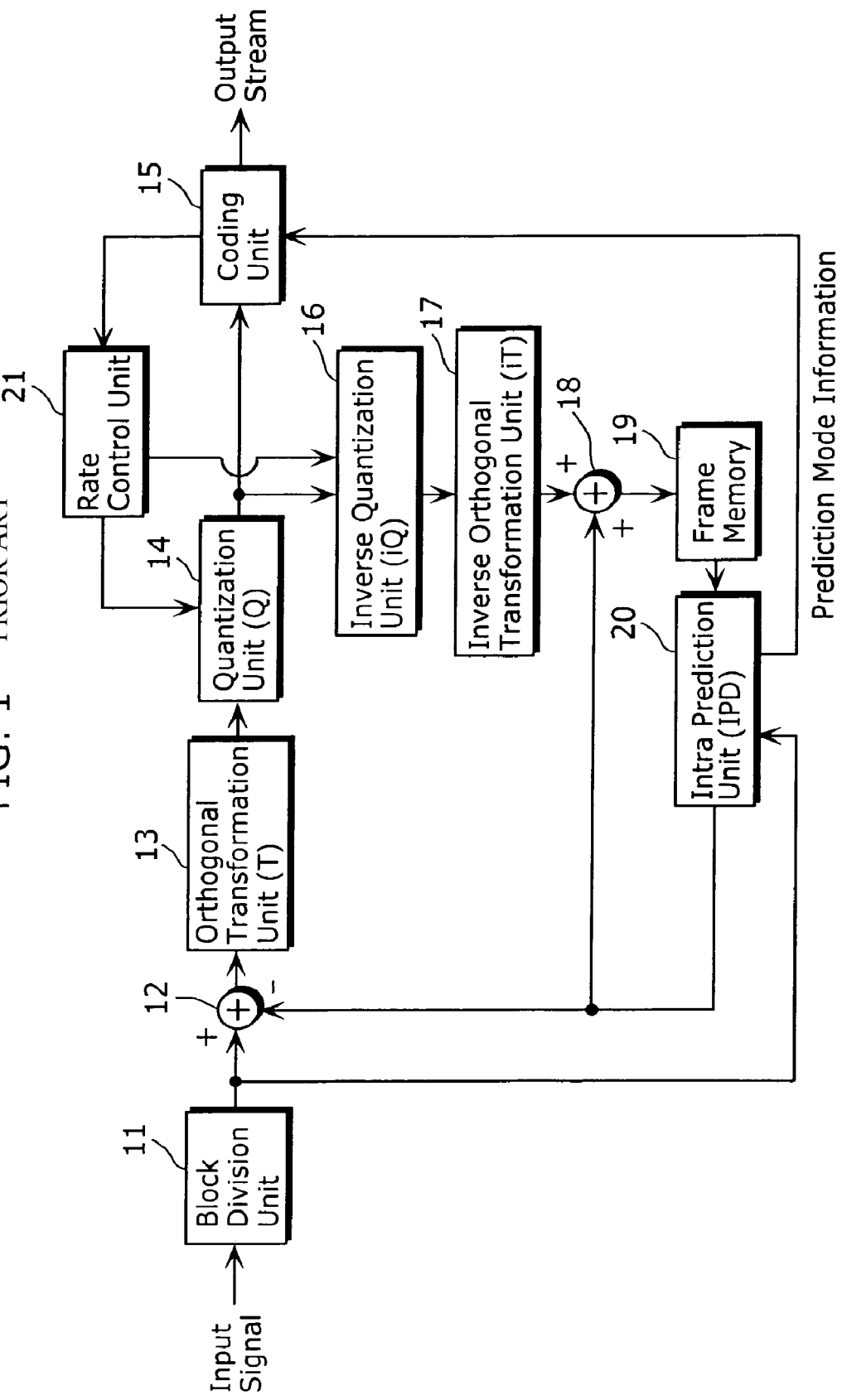
FIG. 1 is a block diagram showing part of the configuration of an image coding apparatus.
Figure 6A:
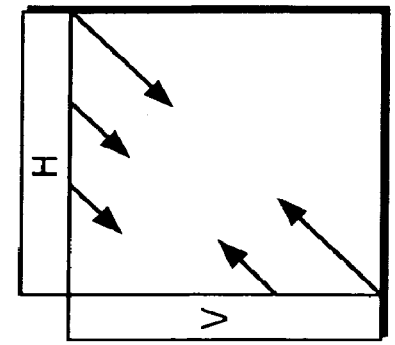
FIG. 6 is a diagram illustrating intra 16×16 prediction of a luminance signal in H.264 image coding.
Figure 6B:
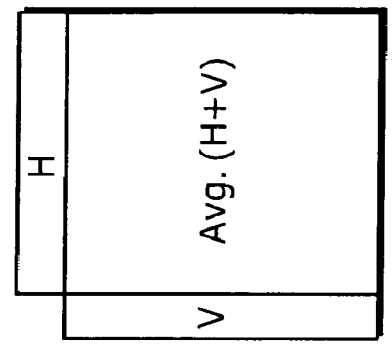
Figure 6C:
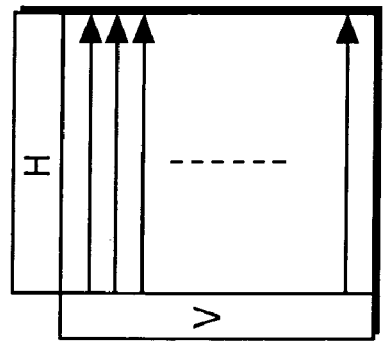
Figure 6D:
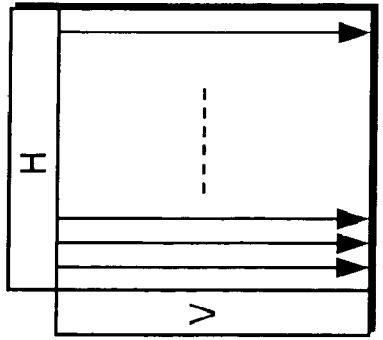

Aside from the predicted block control unit 22 and the sorting buffer 23, the image coding apparatus of the preferred embodiment has the same configuration as the conventional image coding apparatus shown in FIG. 1. Therefore, the same numbers assigned to constituent elements present in the conventional image coding apparatus are assigned to the constituent elements present in the image coding apparatus of the preferred embodiment that have the same functions as those of the conventional image coding apparatus. In the preferred embodiment, descriptions shall be given with particular emphasis placed on the operations of the predicted block control unit 22 and the sorting buffer 23.

The block division unit 11 divides each picture of an inputted moving image into macroblocks (inputted macroblocks), and inputs the inputted macroblocks into the subtraction unit 12. For each pixel in each position, the subtraction unit 12 subtracts the pixel value in a macroblock generated by the intra prediction unit 20 (a predicted macroblock) from the pixel value in the inputted macroblock, and outputs a macroblock made up of the values obtained thereby (a differential macroblock). The differential macroblock is inputted into the orthogonal transformation unit (T) 13, which performs orthogonal transformation on the differential macroblock.

The quantization unit (Q) 14 quantizes the coefficients obtained from the orthogonal transformation unit (T) 13 in accordance with quantization parameters inputted from the rate control unit 21, and outputs the obtained values (quantized orthogonally-transformed coefficients) to the sorting buffer 23 and the inverse quantization unit (iQ) 16. The coding unit 15 codes the quantized orthogonally-transformed coefficients from the sorting buffer 23 and information of the prediction mode number (described later) selected by the intra prediction unit (IPD) 20, and outputs these as a stream.

The inverse quantization unit (iQ) 16 inverse-quantizes the quantized orthogonally-transformed coefficients from the quantization unit (Q) 14 in accordance with quantization parameters inputted from the rate control unit 21, and supplies the resultant to the inverse orthogonal transformation unit (iT) 17. The inverse orthogonal transformation unit (iT) 17 inverse orthogonally-transforms the coefficients supplied from the inverse quantization unit (iQ) 16, and reconstructs a differential macroblock. The reconstructed differential macroblock is inputted, along with the predicted macroblock generated by the intra prediction unit 20, into the addition unit 18.

For each pixel in each position, the addition unit 12 adds the pixel values in the predicted macroblock supplied from the intra prediction unit (IPD) 20 to the pixel values in the reconstructed macroblock, thereby generating a macroblock (reproduction macroblock). The reproduction macroblock is stored in the frame memory 19. Reproduction macroblocks stored in the frame memory 19 are supplied to the intra prediction unit (IPD) 20.

The intra prediction unit (IPD) 20 reads out a reproduction macroblock and a reproduction block (a block reproduced within a macroblock currently being reproduced) and generates a predicted block in accordance with predicted block position information supplied from the predicted block control unit 22 (described later) and the prediction mode used in that predicted block. The intra prediction unit (IPD) 20 calculates, for the generated predicted blocks in each prediction mode, a prediction evaluation value for the block of the input signal that corresponds to the predicted block (the inputted block in the same position as in the corresponding original image), selects the best prediction mode based on that prediction evaluation value, and determines the predicted block. The determined predicted block is supplied to the addition unit 18.

In intra prediction, the following values are used a prediction evaluation values: the sum of the absolute values or the sum of the squares of the error signals of the predicted block and input block in each prediction mode, or a value calculated through a rate-distortion (RD) function that optimizes the balance between distortion, which is the sum of absolute values after Hadamard-transforming the error signals, and the rate, which is the bit amount in coding in the prediction mode in question.

The predicted block control unit 22 acquires information indicating which block, within the macroblock to be predicted, has been predicted (information regarding the position of the block and whether or not intra prediction on that block has finished) by the intra prediction unit (IPD) 20. In addition, the predicted block control unit 22 outputs, to the intra prediction unit (IPD) 20, a control signal specifying which block, within the macroblock to be predicted, is to be intra predicted, and in what prediction mode that block is to be intra predicted. Furthermore, the predicted block control unit 22 supplies position information of each block within the macroblock to the sorting buffer 23.

Figure 7:
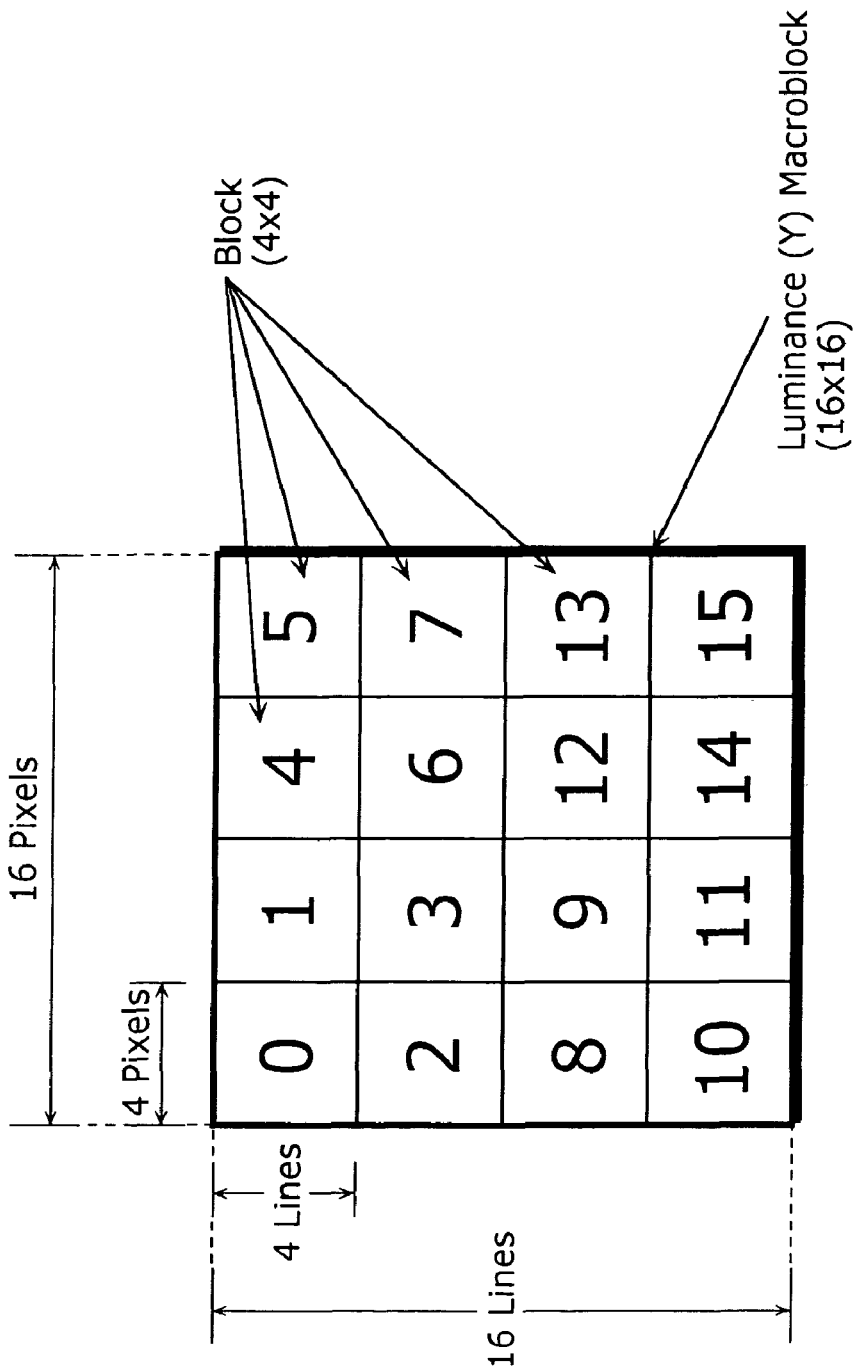
FIG. 7 is a diagram illustrating the order in which blocks within a macroblock are coded in H.264 image coding.
Figures 8A, 8B:
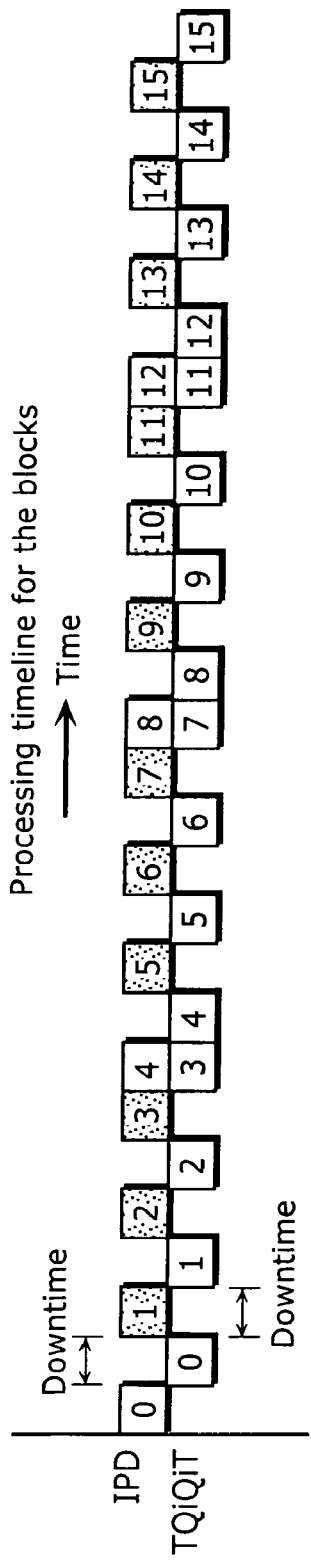
FIG. 8A is a diagram illustrating the order in which blocks within an intra predicted macroblock are processed in H.264 image coding.
FIG. 8B is a diagram illustrating blocks that interfere with pipelining after intra prediction and a timeline of the processing of those blocks.
Figures 9A, 9B:
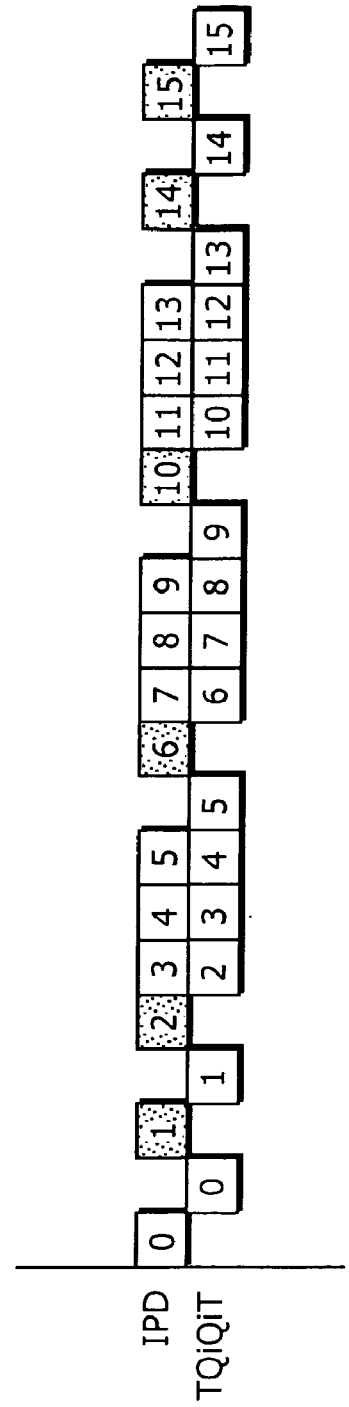
FIG. 9 is a diagram illustrating a processing order and the like of blocks within a macroblock.
Figures 11A, 11B:
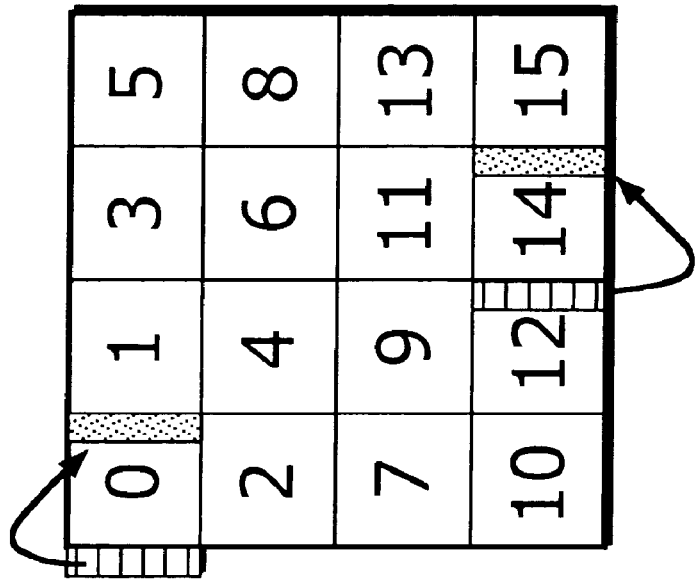
FIG. 11 is a diagram illustrating pixel values that cannot be referred to during intra prediction being replaced with static values or values copied from blocks two blocks away, in conventional image coding.
Figure 12:
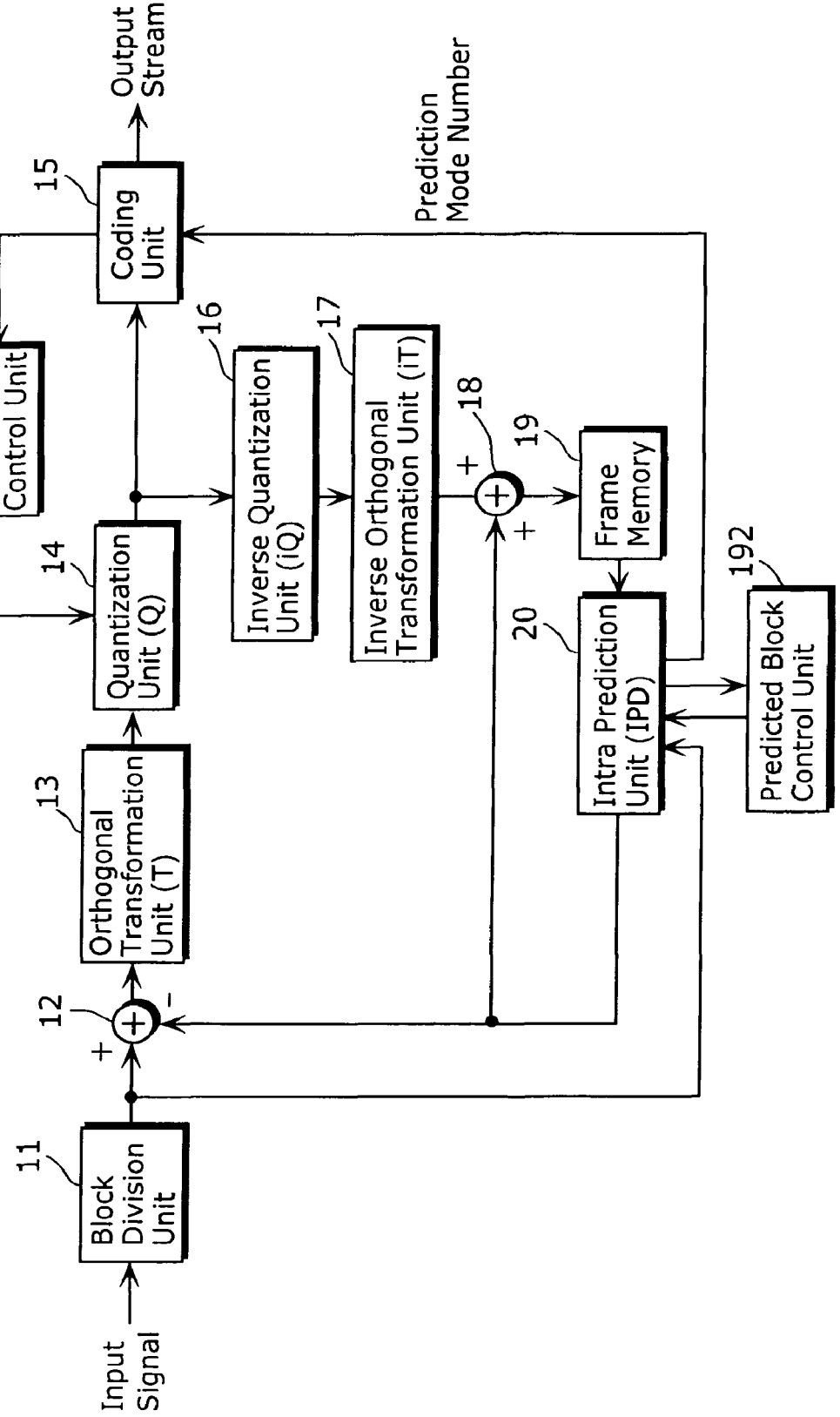
FIG. 12 is a block diagram showing the configuration of the image coding apparatus disclosed in Patent Reference 1.

The sorting buffer 23 is a buffer that rearranges processed blocks within a macroblock into a default order (see FIG. 7) based on block position information supplied from the predicted block control unit 22, and outputs the rearranged blocks to the coding unit 15. FIG. 7 is a diagram showing the processing order for each block when a macroblock is divided into 16 blocks, as prescribed by the H.264 standard. This order is referred to as the "raster scan order." Here, as shown in FIG. 10, the 16 blocks within the macroblock are denoted as 4×4_block(X, Y), and the position (X, Y) of each block is defined as (0, 0) to (3, 3). At this time, for example, when the predicted block control unit 22 provides an instruction to process the blocks within the macroblock in the order shown in FIG. 9, the intra prediction information and quantized orthogonally transformed coefficients of each block are acquired from the quantization unit (Q) 14 and stored in the sorting buffer 23, in the order in which the blocks were processed as shown under the 4×4_block(X, Y) section in FIG. 14(A).

Figure 14B:
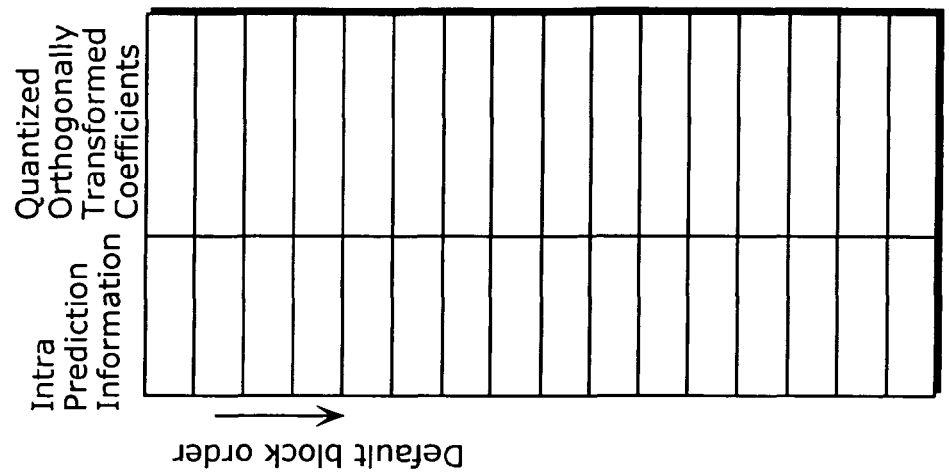
FIG. 14 is a diagram illustrating a method for sorting data outputted when blocks within a macroblock coded in an order different from the standard into the default order in the image coding of the preferred embodiment and outputting the data.
Figure 14A:
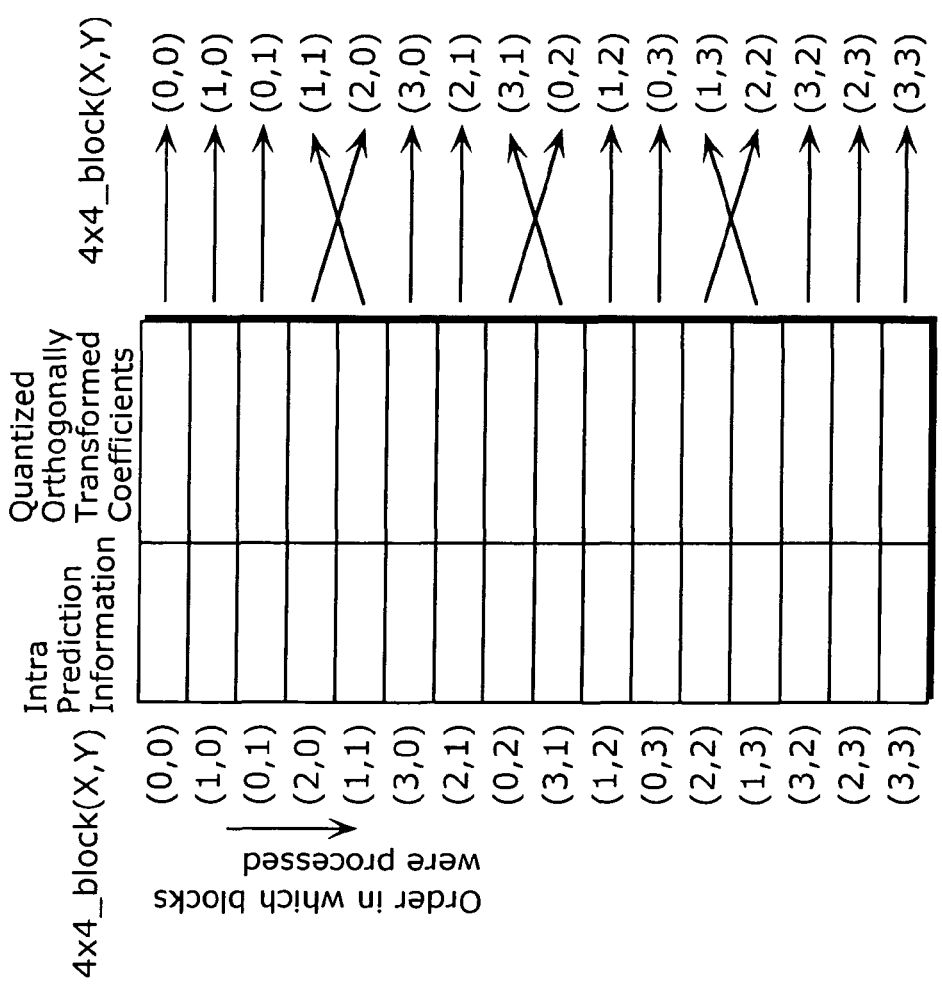

The sorting buffer 23 retrieves the intra prediction information and quantized orthogonally transformed coefficients of the blocks, stored per macroblock, in the default order, as shown by the arrows from FIGS. 14(A) to 14(B), based on the position information of each block within the macroblock supplied by the predicted block control unit 22 and the default position information of each block loaded into the sorting buffer 23 in advance (see the 4×4_block(X, Y) section in FIG. 7 and FIG. 14(B)).

Hereafter, descriptions of several intra prediction coding processes shall be given, focusing on what order and with which prediction mode the blocks in a macroblock are instructed to be processed by the prediction block control unit 22.

(First Intra Prediction)

First, descriptions shall be given regarding a situation where the intra prediction process (IPD) and the process from orthogonal transformation to decoding are performed in the default order (raster scan order; see FIG. 7) as shown in FIG. 15A. In the present specification, the processing from orthogonal transformation to decoding, or in other words, orthogonal transformation performed by the orthogonal transformation unit (T) 13, quantization performed by the quantization unit (Q) 14, inverse quantization performed by the inverse quantization unit (iQ) unit 16, and inverse orthogonal transformation performed by the inverse orthogonal transformation unit (iT) 17, is referred to collectively as "TQiQiT."

In this first intra prediction, prediction modes for intra prediction are set so that IPD and TQiQiT are pipelined (that is, downtime is removed from the process) so that the intra prediction remains as accurate as possible, as shown in FIG. 15C. In other words, prediction modes are set for each block so that pipelining is possible and as many prediction modes as possible are used, as shown in FIG. 15B. Each block in FIG. 15C with a number refers to the block in FIG. 15A with the same number.

It should be noted that prediction mode candidate (option) selection within the standard is an issue related to the implementation of the image coding apparatus. The image decoding apparatus performs inverse intra prediction in accordance with the prediction modes ultimately selected by the image coding apparatus. Accordingly, there is no need to add functions extraneous to those defined in the H.264 standard to the image decoding apparatus.

When intra predicting each of the 16 blocks in the default order (raster scan order), prediction mode candidates (options) are set in each block, as shown in FIG. 15B. When the positions of each of the 16 blocks are expressed as coordinates (0, 0) to (3, 3), as in FIG. 10, the blocks that can be intra predicted using all 9 prediction modes are blocks (0, 0), (0, 2), (2, 0), and (2, 2), or four blocks, as can be seen in FIG. 15B. The blocks that can be predicted using 7 prediction modes, or all prediction modes except for modes 3 and 7, are blocks (0, 1), (0, 3), (2, 1), and (2, 3), or four blocks. The remaining eight blocks, or blocks (1, 0), (1, 1), (1, 2), (1, 3), (3, 0), (3, 1), (3, 2), and (3, 3), can only be intra predicted with prediction modes 0, 3, and 7.

Figure 16:
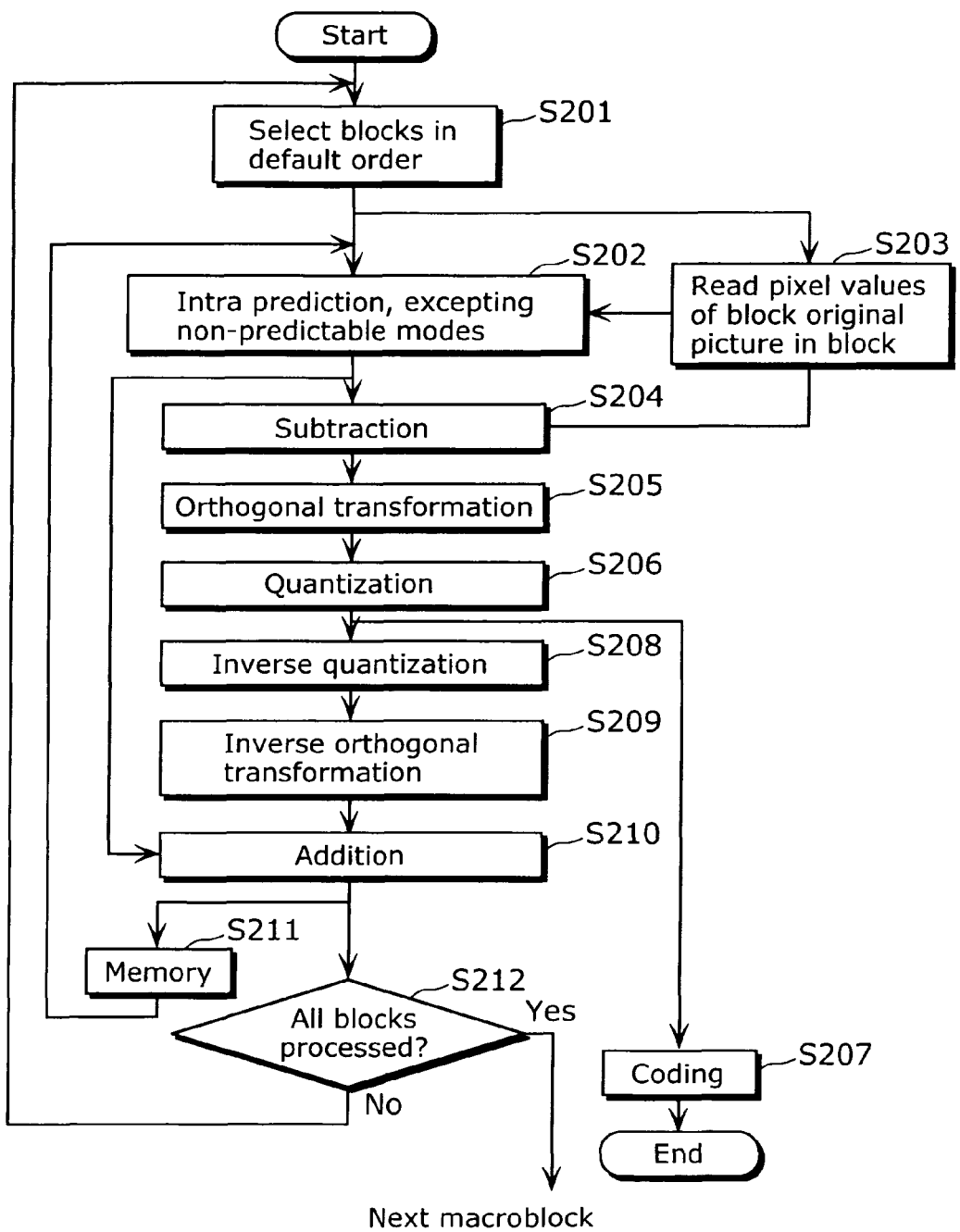
FIG. 16 is a flowchart illustrating a process flow of a first intra prediction in the preferred embodiment.

Operations of the image coding apparatus of the preferred embodiment shall be described using the flowchart in FIG. 16. In this case, the order is the abovementioned default order, and the prediction modes used in intra prediction are limited.

In Step S201, the predicted block control unit 22 selects the blocks to be predicted in the default order, and the process proceeds to Step S202, in which intra prediction is performed, and Step S203, in which the pixel values of the original image to which the selected blocks correspond are read.

In the intra prediction in Step S202, the intra prediction unit 20 first generates predicted blocks for each block in the order shown in FIG. 15A through the prediction modes shown in FIG. 15B. Then, the intra prediction unit 20 uses the pixel values of the predicted blocks from each prediction mode and the pixel values of the blocks of the original image from the input signal which correspond to the predicted blocks read in Step S203 to calculate the aforementioned prediction evaluation value, and determines the best prediction mode. Note that in Step S203, the intra prediction unit 20 reads the pixel values of the original image.

Next, in Step S204, the subtraction unit 12 subtracts the pixel values of the predicted blocks obtained through the prediction mode determined to be the best by the intra prediction unit 20 from the pixel values of the blocks of the original image, for each pixel in each position. In Step S205, the orthogonal transformation unit (T) 13 performs orthogonal transformation on the differential block obtained from the subtraction unit 12, and in Step S206, the quantization unit (Q) 14 quantizes the orthogonally-transformed coefficients obtained from the orthogonal transformation unit (T) 13. The quantized orthogonally transformed coefficients are inputted into the coding unit 15 via the sorting buffer 23, and in Step S207, the coding unit 15 codes the quantized orthogonally transformed coefficients.

Meanwhile, the quantized orthogonally transformed coefficients obtained in Step S206 are inputted into the inverse quantization unit (iQ) 16, and in Step S208, the inverse quantization unit (iQ) 16 inverse-quantizes the quantized orthogonally transformed coefficients. In Step S209, the inverse orthogonal transformation unit (iT) 17 inverse orthogonally transforms the orthogonally transformed coefficients obtained by the inverse quantization unit (iQ) 16. In Step S210, the adding unit 18 adds the differential value of the inverse orthogonally transformed predicted block to the predicted block obtained in Step S202. Through this, a decoded block is reconstructed. The reconstructed decoded blocks are stored in the frame memory 19 in Step S211. The decoded blocks stored in the frame memory 19 are supplied to the intra prediction unit 20, and the pixels of the decoded blocks are used as reference pixels in the intra prediction in Step S202.

In Step S212, the intra prediction unit 20 determines whether or not all blocks in the macroblock to be predicted have been processed (reconstructed), and if all blocks have not been processed (No of Step S212), the process returns to Step S201, and the image coding apparatus of the preferred embodiment performs the same process as described above on the remaining blocks. On the other hand, if all blocks have been processed (Yes of Step S212), the image coding apparatus of the preferred embodiment performs the aforementioned process on the next macroblock.

Note that in the first intra prediction, the blocks are processed in the default order, and therefore the sorting buffer 23 is not necessary. However, even if the sorting buffer 23 is provided in the image coding apparatus, information of the default order is supplied to the sorting buffer 23 by the predicted block control unit 22; therefore, the data of each block is outputted to the coding unit 15 in the processed order (the default order), and thus no problems arise.

(Second Intra Prediction)

Next, descriptions shall be given regarding a situation where the intra prediction process (IPD) and the process from orthogonal transformation to decoding (TQiQiT) are performed in an order different from the default order.

In this second intra prediction as well, prediction modes for intra prediction are set to that IPD and TQiQiT are pipelined (that is, downtime is removed from the process) and so that the intra prediction remains as accurate as possible, as shown in FIG. 17C. In other words, prediction modes are set for each block so that pipelining is possible and as many prediction modes as possible are used, as shown in FIG. 17B. Each block in FIG. 17C with a number refers to the block in FIG. 17A with the same number.

When intra predicting each of the 16 blocks in an order different from the default order (an order different from the raster scan order), prediction mode candidates (options) are set in each block, as shown in FIG. 17B. That is, in the second intra prediction, the blocks that can be intra predicted using all nine prediction modes are blocks (0, 0), (0, 2), (1, 1), (1, 2), (1, 3), (2, 0), (2, 2), (3, 0), (3, 1), and (3, 2), or ten blocks, as shown in FIG. 17B. The blocks that can be predicted using 7 prediction modes, or all prediction modes except for modes 3 and 7, are blocks (0, 1), (0, 3), (2, 1), and (2, 3), or four blocks. The remaining two blocks, or blocks (1, 0) and (3, 3), can only be intra predicted with prediction modes 0, 3, and 7.

When the second intra prediction is compared to the first intra prediction, it can be seen that the number of blocks that can be intra predicted through all prediction modes increases significantly, from four blocks to ten blocks. In other words, the accuracy of the intra prediction is much higher in the second intra prediction than in the first intra prediction.

Figure 18:
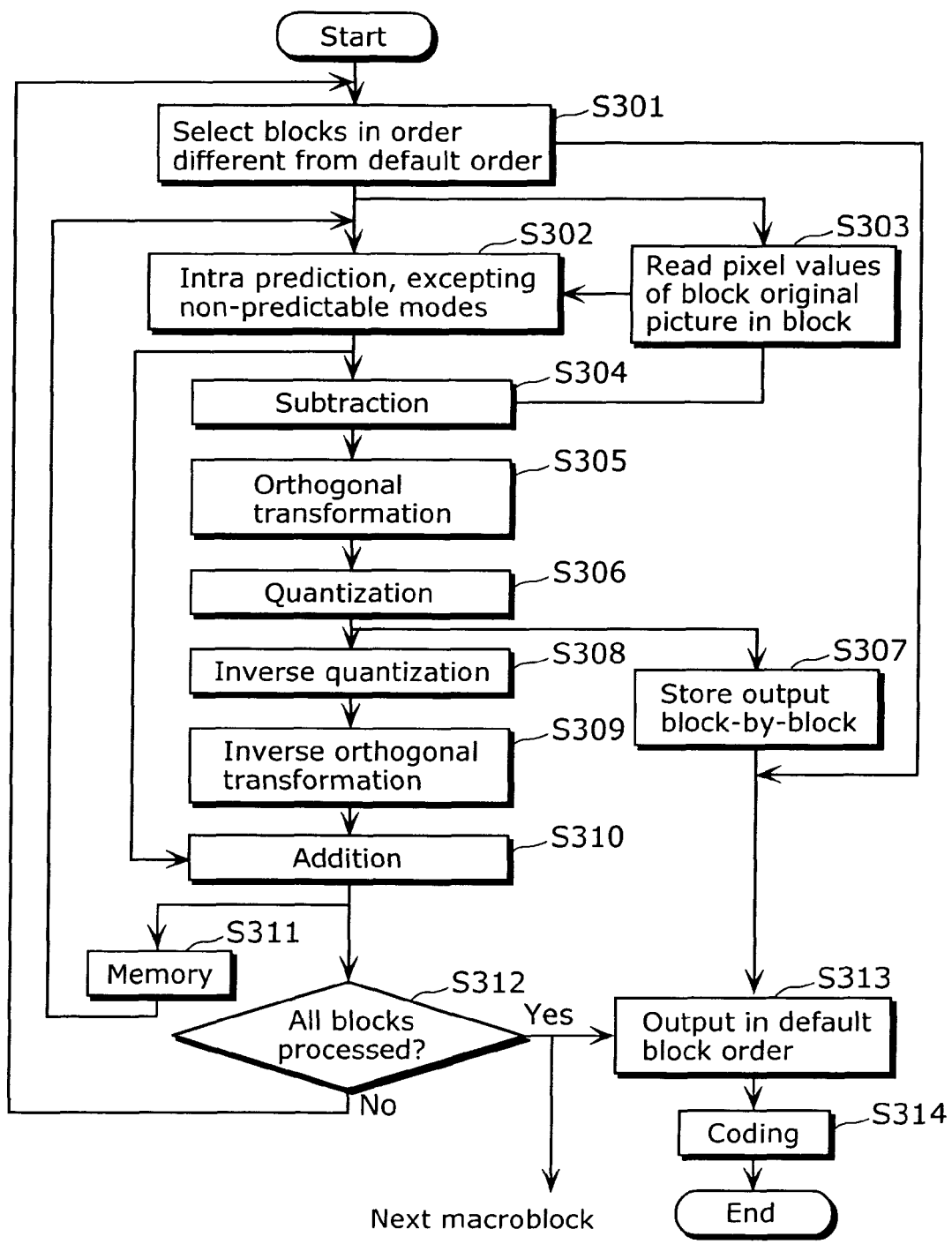
FIG. 18 is a flowchart illustrating a process flow of a second intra prediction in the preferred embodiment.

Operations of the image coding apparatus of the preferred embodiment shall be described using the flowchart in FIG. 18. In this case, the order is different from the abovementioned default order, and the prediction modes used in intra prediction are limited.

In Step S301, the predicted block control unit 22 selects the blocks to be predicted in an order different from the default order, and the process proceeds to Step S302, in which intra prediction is performed, and Step S303, in which the pixel values of the original image to which the selected blocks correspond are read. The predicted block control unit 22 outputs position information of the blocks to be processed to the sorting buffer 23.

In the intra prediction in Step S302, the intra prediction unit 20 first generates predicted blocks for each block in the order shown in FIG. 17A through the prediction modes shown in FIG. 17B. Then, the intra prediction unit 20 uses the pixel values of the predicted blocks from each prediction mode and the pixel values of the blocks of the original image from the input signal which correspond to the predicted blocks read in Step S303 to calculate the aforementioned prediction evaluation value, and determines the best prediction mode. Note that in Step S303, the intra prediction unit 20 reads the pixel values of the original image.

Next, in Step S304, the subtraction unit 12 subtracts the pixel values of the predicted blocks obtained through the prediction mode determined to be the best by the intra prediction unit 20 from the pixel values of the blocks of the original image, for each pixel in each position. In Step S305, the orthogonal transformation unit (T) 13 performs orthogonal transformation on the differential block obtained from the subtraction unit 12, and in Step S306, the quantization unit (Q) 14 quantizes the coefficients obtained from the orthogonal transformation unit (T) 13. In Step S307, the quantized orthogonally transformed coefficients are stored as groups per block in the sorting buffer 23.

Meanwhile, the orthogonally transformed coefficients of the differential values of the predicted blocks obtained in Step S306 (quantized orthogonally transformed coefficients) are inputted into the inverse quantization unit (iQ) 16, and in Step S308, the inverse quantization unit (iQ) 16 inverse-quantizes the quantized orthogonally transformed coefficients. In Step S309, the inverse orthogonal transformation unit (iT) 17 inverse orthogonally transforms the orthogonally transformed coefficients obtained by the inverse quantization unit (iQ) 16. In Step S310, the adding unit 18 adds the differential value of the inverse orthogonally transformed predicted block to the predicted block obtained in Step S302. Through this, a decoded block is reconstructed. The reconstructed decoded blocks are stored in the frame memory 19 in Step S311. The decoded blocks stored in the frame memory 19 are supplied to the intra prediction unit 20, and the pixels of the decoded blocks are used as reference pixels in the intra prediction in Step S302.

In Step S312, the intra prediction unit 20 determines whether or not all blocks in the macroblock to be predicted have been processed (reconstructed), and if all blocks have not been processed (No of Step S312), the process returns to Step S301, and the image coding apparatus of the preferred embodiment performs the same process as described above on the remaining blocks. On the other hand, if all blocks have been processed (Yes of Step S312), the process continues on to Step S313, while the image coding apparatus of the preferred embodiment performs the aforementioned process on the next macroblock.

In Step S313, the sorting buffer 23 retrieves the quantized orthogonally transformed coefficients, which are the differential values of the predicted blocks, and which have been stored block-by-block in Step S307, so as to fall into the default order, and outputs the resultant to the coding unit 15. In Step S314, the coding unit 15 codes the quantized orthogonally transformed coefficients in the default order.

It should be noted that in the abovementioned first intra prediction and second intra prediction, the types and numbers of prediction modes differ with each block. From the standpoint of processing consistency, there are situations where the same prediction mode is set for all blocks; in such a case, a third intra prediction, described hereafter, may be used.

(Third Intra Prediction)

Figures 19A, 19B, 19C:
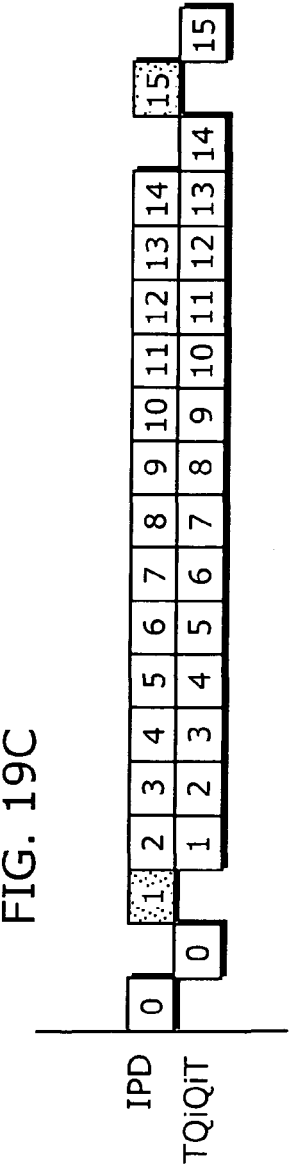
FIG. 19 is a diagram illustrating processing conditions and the like of a third intra prediction in the preferred embodiment.

With the third intra prediction, each block is intra predicted in an order different from the default order, as shown in FIG. 19A, and prediction modes are set for each block, as shown in FIG. 19B, so that the IPD and TQiQiT are pipelined (two instances of downtime arise in the process), as shown in FIG. 19C.

When intra predicting each of the 16 blocks through the prediction modes shown in FIG. 19B, and in an order different from the default order, there are no blocks for which intra prediction can be performed using all nine prediction modes. However, intra prediction can be performed on all blocks using seven prediction modes (all prediction modes except mode 3 and mode 7). However, two blocks, or the blocks (0, 1) and (3, 3), interfere with pipelining.

The third intra prediction is executed by the sorting buffer 23 causing intra prediction of each block through the prediction modes shown in FIG. 19B and in the order different from the default order shown in FIG. 19A. The sorting buffer 23 rearranges the processed blocks into the default order and outputs the resultant to the coding unit 15.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The image coding apparatus according to the present invention is applicable in an image coding apparatus that codes pictures on a block-by-block bases, and is particularly suitable for use in web servers that distribute moving picture data, terminal apparatuses that receive moving picture data, digital cameras capable of recording and reproducing moving picture data, camera-equipped cellular phones, DVD recording/reproduction devices, PDAs, personal computers, and so on.

What is claimed is:

1. An image coding apparatus that performs orthogonal transformation, quantization, inverse quantization, inverse orthogonal transformation, and intra prediction on all blocks obtained when a single macroblock is divided into plural blocks, said apparatus comprising:

a control unit operable to cause all of the blocks to be intra predicted using at least one of the intra prediction modes specified in the H.264 standard on at least some of the blocks, in an order different from the raster scan order specified in the H.264 standard; and an output unit operable to output, in the raster scan order, all the blocks intra predicted under the control of said control unit, wherein the macroblock has 16 lines made up of 16 pixels each, the blocks each have 4 lines made up of 4 pixels each, and assuming the position of each block in the macroblock is expressed as (X, Y) coordinates, where X, Y=0, 1, 2, 3 starting from the upper left of the macroblock, said control unit is operable to:

(A) cause the blocks located in positions (0, 1), (2, 1), (0, 3), and (2, 3) to be intra predicted through modes 0, 1, 2, 4, 5, 6, and 8 specified in the H.264 standard;

(B) cause the blocks located in positions (1, 0) and (3, 3) to be intra predicted through modes 0, 3, and 7 specified in the H.264 standard;

(C) cause the blocks located in positions (0, 0), (2, 0), (3, 0), (1, 1), (3, 1), (0, 2), (1, 2), (2, 2), (3, 2), and (1, 3) to be intra predicted through modes 0 through 8 specified in the H.264 standard; and (D) cause the 16 blocks to be intra predicted in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3).

2. The image coding apparatus according to claim 1, wherein said control unit is operable to cause the intra prediction of a second block, which is a block located to the left of a first block, and the intra prediction of a third block, which is a block located above the first block, to be performed at least two places in processing order ahead of the intra prediction of the first block, the first block being a single block among all the blocks.

3. An image coding apparatus that performs orthogonal transformation, quantization, inverse quantization, inverse orthogonal transformation, and intra prediction on all blocks obtained when a single macroblock is divided into plural blocks, said apparatus comprising:
a control unit operable to cause all of the blocks to be intra predicted using at least one of the intra prediction modes specified in the H.264 standard on at least some of the blocks, in an order different from the raster scan order specified in the H.264 standard; and
an output unit operable to output, in the raster scan order, all the blocks intra predicted under the control of said control unit,
wherein the macroblock has 16 lines made up of 16 pixels each,
the blocks each have 4 lines made up of 4 pixels each, and said control unit is operable to:
(A) cause all the blocks to be intra predicted through modes 0, 1, 2, 4, 5, 6, and 8 specified in the H.264 standard; and
(B) cause the 16 blocks to be intra predicted in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3).

4. An image coding apparatus that performs orthogonal transformation, quantization, inverse quantization, inverse orthogonal transformation, and intra prediction on all blocks obtained when a single macroblock is divided into plural blocks, said apparatus comprising:
a control unit operable to cause all of the blocks to be intra predicted using at least one of the intra prediction modes specified in the H.264 standard on all of the blocks, in the raster scan order specified in the H.264 standard,
wherein the macroblock has 16 lines made up of 16 pixels each,
the blocks each have 4 lines made up of 4 pixels each, and assuming the position of each block in the macroblock is expressed as (X, Y) coordinates, where X, Y=0, 1, 2, 3 starting from the upper left of the macroblock, said control unit is operable to:
(A) cause the blocks located in positions (0, 1), (2, 1), (0, 3), and (2, 3) to be intra predicted through modes 0, 1, 2, 4, 5, 6, and 8 specified in the H.264 standard;
(B) cause the blocks located in positions (1, 0), (3, 0), (1, 1), (3, 1), (1, 2), (3, 2), (1, 3) and (3, 3) to be intra predicted through modes 0, 3, and 7 specified in the H.264 standard;
(C) cause the blocks located in positions (0, 0), (2, 0), (0, 2), and (2, 2), to be intra predicted through modes 0 through 8 specified in the H.264 standard; and
(D) cause the 16 blocks to be intra predicted in the following order: (0, 0), (1, 0), (0, 1), (1, 1), (2, 0), (3, 0), (2, 1), (3, 1), (0, 2), (1, 2), (0, 3), (1, 3), (2, 2), (3, 2), (2, 3), (3, 3).

5. An image coding method for performing orthogonal transformation, quantization, inverse quantization, inverse orthogonal transformation, and intra prediction on all blocks obtained when a single macroblock is divided into plural blocks, said method comprising:
performing control that causes all of the blocks to be intra predicted using at least one of the intra prediction modes specified in the H.264 standard on at least some of the blocks, in an order different from the raster scan order specified in the H.264 standard; and
outputting, in the raster scan order, all the blocks intra predicted under said control wherein the macroblock has 16 lines made up of 16 pixels each,
the blocks each have 4 lines made up of 4 pixels each, and assuming the position of each block in the macroblock is expressed as (X, Y) coordinates, where X, Y=0, 1, 2, 3 starting from the upper left of the macroblock, said performing includes:
(A) causing the blocks located in positions (0, 1), (2, 1), (0, 3), and (2, 3) to be intra predicted through modes 0, 1, 2, 4, 5, 6, and 8 specified in the H.264 standard;
(B) causing the blocks located in positions (1, 0) and (3, 3) to be intra predicted through modes 0, 3, and 7 specified in the H.264 standard;
(C) causing the blocks located in positions (0, 0), (2, 0), (3, 0), (1, 1), (3, 1), (0, 2), (1, 2), (2, 2), (3, 2), and (1, 3) to be intra predicted through modes 0 through 8 specified in the H.264 standard; and
(D) causing the 16 blocks to be intra predicted in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3).

6. An image coding method for performing orthogonal transformation, quantization, inverse quantization, inverse orthogonal transformation, and intra prediction on all blocks obtained when a single macroblock is divided into plural blocks, said method comprising:
performing control that causes all of the blocks to be intra predicted using at least one of the intra prediction modes specified in the H.264 standard on all of the blocks, in the raster scan order specified in the H.264 standard
wherein the macroblock has 16 lines made up of 16 pixels each,
the blocks each have 4 lines made up of 4 pixels each, and assuming the position of each block in the macroblock is expressed as (X, Y) coordinates, where X, Y=0, 1, 2, 3 starting from the upper left of the macroblock, said performing includes:
(A) causing the blocks located in positions (0, 1), (2, 1), (0, 3), and (2, 3) to be intra predicted through modes 0, 1, 2, 4, 5, 6, and 8 specified in the H.264 standard;
(B) causing the blocks located in positions (1, 0), (3, 0), (1, 1), (3, 1), (1, 2), (3, 2), (1, 3) and (3, 3) to be intra predicted through modes 0, 3, and 7 specified in the H.264 standard;
(C) causing the blocks located in positions (0, 0), (2, 0), (0, 2), and (2, 2), to be intra predicted through modes 0 through 8 specified in the H.264 standard; and
(D) causing the 16 blocks to be intra predicted in the following order: (0, 0), (1, 0), (0, 1), (1, 1), (2, 0), (3, 0), (2, 1), (3, 1), (0, 2), (1, 2), (0, 3), (1, 3), (2, 2), (3, 2), (2, 3), (3, 3).

7. An integrated circuit that performs orthogonal transformation, quantization, inverse quantization, inverse orthogonal transformation, and intra prediction on all blocks obtained when a single macroblock is divided into plural blocks, said circuit comprising:
a control unit operable to cause all of the blocks to be intra predicted using at least one of the intra prediction modes specified in the H.264 standard on at least some of the blocks, in an order different from the raster scan order specified in the H.264 standard; and
an output unit operable to output, in the raster scan order, all the blocks intra predicted under the control of said control unit
wherein the macroblock has 16 lines made up of 16 pixels each,
the blocks each have 4 lines made up of 4 pixels each, and assuming the position of each block in the macroblock is expressed as (X, Y) coordinates, where X, Y=0, 1, 2, 3 starting from the upper left of the macroblock, said control unit is operable to:

(A) cause the blocks located in positions (0, 1), (2, 1), (0, 3), and (2, 3) to be intra predicted through modes 0, 1, 2, 4, 5, 6, and 8 specified in the H.264 standard;

(B) cause the blocks located in positions (1, 0) and (3, 3) to be intra predicted through modes 0, 3, and 7 specified in the H.264 standard;

(C) cause the blocks located in positions (0, 0), (2, 0), (3, 0), (1, 1), (3, 1), (0, 2), (1, 2), (2, 2), (3, 2), and (1, 3) to be intra predicted through modes 0 through 8 specified in the H.264 standard; and (D) cause the 16 blocks to be intra predicted in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3).

8. An integrated circuit that performs orthogonal transformation, quantization, inverse quantization, inverse orthogonal transformation, and intra prediction on all blocks obtained when a single macroblock is divided into plural blocks, said circuit comprising:

a control unit operable to cause all of the blocks to be intra predicted using at least one of the intra prediction modes specified in the H.264 standard on all of the blocks, in the raster scan order specified in the H.264 standard wherein the macroblock has 16 lines made up of 16 pixels each, the blocks each have 4 lines made up of 4 pixels each, and assuming the position of each block in the macroblock is expressed as (X, Y) coordinates, where X, Y=0, 1, 2, 3 starting from the upper left of the macroblock, said control unit is operable to:

(A) cause the blocks located in positions (0, 1), (2, 1), (0, 3), and (2, 3) to be intra predicted through modes 0, 1, 2, 4, 5, 6, and 8 specified in the H.264 standard;

(B) cause the blocks located in positions (1, 0), (3, 0), (1, 1), (3, 1), (1, 2), (3, 2), (1, 3) and (3, 3) to be intra predicted through modes 0, 3, and 7 specified in the H.264 standard;

(C) cause the blocks located in positions (0, 0), (2, 0), (0, 2), and (2, 2), to be intra predicted through modes 0 through 8 specified in the H.264 standard; and (D) cause the 16 blocks to be intra predicted in the following order: (0, 0), (1, 0), (0, 1), (1, 1), (2, 0), (3, 0), (2, 1), (3, 1), (0, 2), (1, 2), (0, 3), (1, 3), (2, 2), (3, 2), (2, 3), (3, 3).

9. A non-transitory computer-readable medium having a program stored thereon, the program causing a computer to perform orthogonal transformation, quantization, inverse quantization, inverse orthogonal transformation, and intra prediction on all blocks obtained when a single macroblock is divided into plural blocks, the program further causing the computer to perform steps of:

performing control that causes all of the blocks to be intra predicted using at least one of the intra prediction modes specified in the H.264 standard on at least some of the blocks, in an order different from the raster scan order specified in the H.264 standard; and outputting, in the raster scan order, all the blocks intra predicted under said control wherein the macroblock has 16 lines made up of 16 pixels each, the blocks each have 4 lines made up of 4 pixels each, and assuming the position of each block in the macroblock is expressed as (X, Y) coordinates, where X, Y=0, 1, 2, 3 starting from the upper left of the macroblock, the performing includes:

(A) causing the blocks located in positions (0, 1), (2, 1), (0, 3), and (2, 3) to be intra predicted through modes 0, 1, 2, 4, 5, 6, and 8 specified in the H.264 standard;

(B) causing the blocks located in positions (1, 0) and (3, 3) to be intra predicted through modes 0, 3, and 7 specified in the H.264 standard;

(C) causing the blocks located in positions (0, 0), (2, 0), (3, 0), (1, 1), (3, 1), (0, 2), (1, 2), (2, 2), (3, 2), and (1, 3) to be intra predicted through modes 0 through 8 specified in the H.264 standard; and (D) causing the 16 blocks to be intra predicted in the following order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), (3, 3).

10. A non-transitory computer-readable medium having a program stored thereon, the program causing a computer to perform orthogonal transformation, quantization, inverse quantization, inverse orthogonal transformation, and intra prediction on all blocks obtained when a single macroblock is divided into plural blocks, the program further causing the computer to perform a step of:

performing control that causes all of the blocks to be intra predicted using at least one of the intra prediction modes specified in the H.264 standard on all of the blocks, in the raster scan order specified in the H.264 standard wherein the macroblock has 16 lines made up of 16 pixels each, the blocks each have 4 lines made up of 4 pixels each, and assuming the position of each block in the macroblock is expressed as (X, Y) coordinates, where X, Y=0, 1, 2, 3 starting from the upper left of the macroblock, the performing includes:

(A) causing the blocks located in positions (0, 1), (2, 1), (0, 3), and (2, 3) to be intra predicted through modes 0, 1, 2, 4, 5, 6, and 8 specified in the H.264 standard;

(B) causing the blocks located in positions (1, 0), (3, 0), (1, 1), (3, 1), (1, 2), (3, 2), (1, 3) and (3, 3) to be intra predicted through modes 0, 3, and 7 specified in the H.264 standard;

(C) causing the blocks located in positions (0, 0), (2, 0), (0, 2), and (2, 2), to be intra predicted through modes 0 through 8 specified in the H.264 standard; and (D) causing the 16 blocks to be intra predicted in the following order: (0, 0), (1, 0), (0, 1), (1, 1), (2, 0), (3, 0), (2, 1), (3, 1), (0, 2), (1, 2), (0, 3), (1, 3), (2, 2), (3, 2), (2, 3), (3, 3).

* * * * *